US008619023B2

(12) United States Patent
Park et al.

(10) Patent No.: US 8,619,023 B2
(45) Date of Patent: Dec. 31, 2013

(54) METHOD AND DEVICE FOR INPUTTING FORCE INTENSITY AND ROTATION INTENSITY BASED ON MOTION SENSING

(75) Inventors: Kyu-Cheol Park, Seoul (KR); Jung-Hwan Lee, Gyeonggi-do (KR); Won-Jang Park, Seoul (KR); Byung-Chun Sakong, Gyeonggi-do (KR); Sang-Bum Kim, Seoul (KR); Woo-Hee Yang, Gyeonggi-do (KR)

(73) Assignee: Microinfinity, Inc., Gyeonggi-Do (KP)

( * ) Notice: Subject to any disclaimer, the term of this patent is extended or adjusted under 35 U.S.C. 154(b) by 295 days.

(21) Appl. No.: 12/604,820

(22) Filed: Oct. 23, 2009

(65) Prior Publication Data

US 2010/0123656 A1 May 20, 2010

(30) Foreign Application Priority Data

Nov. 14, 2008 (KR) ........................ 10-2008-0113610
May 12, 2009 (KR) ........................ 10-2009-0041339

(51) Int. Cl.
*G09G 5/00* (2006.01)

(52) U.S. Cl.
USPC .......................................................... 345/156

(58) Field of Classification Search
None
See application file for complete search history.

(56) References Cited

U.S. PATENT DOCUMENTS

2005/0174324 A1* 8/2005 Liberty et al. ................ 345/156
2005/0212767 A1 9/2005 Marvit et al.
2006/0022833 A1* 2/2006 Ferguson et al. .......... 340/573.1
2006/0256077 A1 11/2006 Tsai et al.
2007/0021208 A1* 1/2007 Mao et al. ....................... 463/36
2007/0084278 A1* 4/2007 Kawal et al. .................... 73/172
2007/0146325 A1* 6/2007 Poston et al. ................ 345/163
2007/0211025 A1* 9/2007 Sato .............................. 345/158
2009/0022369 A1* 1/2009 Satoh et al. .................. 382/106
2009/0027337 A1* 1/2009 Hildreth ....................... 345/158

FOREIGN PATENT DOCUMENTS

JP 2007525775 A 9/2007
KR 2004-0108218 A 12/2004
KR 20040108218 A 12/2004

(Continued)

OTHER PUBLICATIONS

Notice of Allowance, issued Jul. 27, 2011, received in counterpart Korean Patent Application No. 10-2009-0041339, 5 pgs.

(Continued)

*Primary Examiner* — Charles V. Hicks
*Assistant Examiner* — Kirk Hermann
(74) *Attorney, Agent, or Firm* — Brian J. Colandreo; Michael T. Abramson; Holland & Knight LLP

(57) ABSTRACT

Provided is an input device for operating in a three-dimensional space and inputting user instructions. The input device includes a first operation unit that calculates a first rotation angle in a coordinate system independent of the attitude of the device based on the output value of a first sensor, a second operation unit that calculates a second rotation angle in the coordinate system based on the output value of a second sensor, an attitude angle measuring unit that calculates the attitude angle of the input device by combining the first rotation angle and the second rotation angle, and an intensity calculation unit that calculates force intensity in the coordinate system using acceleration of the input device and the attitude angle of the input device obtained in the attitude measuring unit.

14 Claims, 21 Drawing Sheets

(56) References Cited

FOREIGN PATENT DOCUMENTS

| | | | | |
|---|---|---|---|---|
| KR | 2006-0030188 | A | | 4/2006 |
| KR | 2006-0081509 | A | | 7/2006 |
| KR | 1020060081509 | A | * | 7/2006 |
| KR | 20070007951 | A | | 1/2007 |
| WO | 2005109879 | A2 | | 11/2005 |
| WO | WO 2005109879 | A2 | * | 11/2005 |
| WO | WO 2006128093 | A2 | * | 11/2006 |

OTHER PUBLICATIONS

English translation of abstract of Korean Publication No. 20040108218, 1 pg.

English translation of abstract of Korean Publication No. 20070007951, 1 pg.

International Search Report with Written Opinion, dated Jun. 16, 2010, received in international patent application no. PCT/KR2009/006572, 11 pgs.

English Abstract of Japanese Patent Application No. 2007-535773, 1 pg.

Supplementary European Search Report mailed Jul. 20, 2012, received in related European application number 09826256.1 (6 pgs.).

English translation of Abstract of JP2007525775, (1 page).

Japanese Office Action, issued Nov. 26, 2012, in corresponding Japanese Patent Application No. 2011-53521, (2 pages).

Translation of Japanese Office Action, issued Nov. 26, 2012, in corresponding Japanese Patent Application No. 2011-53521, (2 pages).

* cited by examiner

DEVICE MOVEMENT AT MAXIMUM LEVEL

BETWEEN NO MOVEMENT AND MAXIMUM MOVEMENT $$\theta = \alpha \cdot \theta_1 + (1 - \alpha) \cdot \theta_2$$

$\theta = \theta_2$

NO MOVEMENT IN DEVICE

METHOD AND DEVICE FOR INPUTTING FORCE INTENSITY AND ROTATION INTENSITY BASED ON MOTION SENSING

CROSS-REFERENCE TO RELATED APPLICATION

This application is based on and claims priority from Korean Patent Application Nos. 10-2008-0113610, filed on Nov. 14, 2008, and 10-2009-0041339, filed on May 12, 2009, the disclosure of which is incorporated herein in its entirety by reference.

BACKGROUND OF THE INVENTION

1. Field of the Invention

Methods and apparatuses consistent with the present invention relate to a user instruction input device including a movement sensor. More particularly, the present invention relates to a user instruction input device capable of inputting force intensity and rotation intensity naturally and accurately based on device movements in a three-dimensional space.

2. Description of the Related Art

As computer science develops, various devices that allow users to input information in a computer device have been developed. One of such devices is called a user command input device. As a user manipulates such device components, position data corresponding to motion of the user command input device are generated. Also, such position data are converted into motions of a pointer image shown on the display. Hence, by moving the user command input device, the user may link the pointer image with objects displayed on the display. Here, an object refers to a user interface that allows a certain action to be performed when a menu, a button or an image is selected. After that, the user can perform a certain command related with the corresponding object through a selection action such as pushing a certain button of the user command input device.

General personal computer users use operating systems with graphical user interfaces, such as Microsoft Windows and MAC OS X, to operate their computer. This is due to convenient mouse functions and various graphic functions that are not supported in console based operating systems such as DOS (Disk Operating System) system and some UNIX versions, and users can simply input commands through a mouse dragging, scrolling or a click without a keyboard input.

On the other hand, various commands are inputted using a key pad prepared on a remote control device in an image display device that cannot use a keyboard or a mouse that is used in a personal computer, such as a digital TV, a set-top box, a game machine. Such a key pad input method has been mainly used because such devices are not fixed on a certain position for the operation of the device unlike a personal computer, and operation is necessary in an open space such as a living room, so it is difficult to use an input means fixed on a plane such as a keyboard or mouse.

Considering such problems, three-dimensional user command input devices with a motion sensor such as a gyroscope and an accelerometer are recently being developed. By moving a three-dimensional user command input device, a user can move a pointer image on the corresponding display in a desired direction and at a desired speed, and by pushing a certain button on the user command input device, the user can select and execute a desired action.

Recently, various systems that use three-dimensional user instruction input devices such as game consoles, aviation simulation devices and sports simulation devices are being introduced. In such new systems, in addition to controlling linear movements of objects on the screen simply through user input devices (e.g., controlling the pointer on the screen), various forms of methods of inputting user commands such as transmitting force to objects existing in the three-dimensional space or making rotations using the input device can be used.

Likewise, the most important point in transmitting a momentum such as force or rotation to objects, is how naturally objects on the screen respond (or operate) in response to the user actions of moving the actual input device. The user's feeling on how naturally such objects on the screen respond would be different depending on the user, but from the perspective of the simulation, the physical response to a certain input would be unique. Hence, it is essential to regulate the relationship between the input and the response so that the input is close to the unique response.

SUMMARY OF THE INVENTION

An objective of the present invention is to provide a method and device for a user to naturally input force intensity and rotation intensity to objects through arbitrary movements in a three-dimensional space.

The present invention will not be limited to the technical objectives described above. Other objectives not described herein will be more definitely understood by those in the art from the following detailed description.

According to an exemplary embodiment of the present invention, there is provided an input device for operating in a three-dimensional space and inputting user instructions including a first operation unit that calculates a first rotation angle in a coordinate system independent of the attitude of the device based on the output value of a first sensor, a second operation unit that calculates a second rotation angle in the coordinate system based on the output value of a second sensor, an attitude angle measuring unit that calculates the attitude angle of the input device by combining the first rotation angle and the second rotation angle, and an intensity calculation unit that calculates force intensity in the coordinate system using acceleration of the input device and the attitude angle of the input device obtained in the attitude measuring unit.

According to an exemplary embodiment of the present invention, there is provided an input device for operating in a three-dimensional space and inputting user instructions including a sensor that senses acceleration of the input device for at least one direction, an intensity calculation unit that calculates force intensity of a body frame based on the sensed acceleration, and an intensity mapping unit that maps the calculated force intensity to finally outputted force intensity according to a mapping function.

According to an exemplary embodiment of the present invention, there is provided an input device for operating in a three-dimensional space and inputting user instructions including a first operation unit that calculates a first rotation angle in a coordinate system independent of the attitude of the device based on the output value of a first sensor, a second operation unit that calculates a second rotation angle in the coordinate system based on the output of a second sensor, an attitude measuring unit that calculates the attitude angle of the input device by combining the first rotation angle and the second rotation angle, and an intensity calculation unit that calculates rotation intensity in the coordinate system based on the angular rate of the input device and the attitude angle of the input device obtained from the attitude angle measuring unit.

According to an exemplary embodiment of the present invention, there is provided an input device for operating in a three-dimensional space and inputting user instructions including a sensor that senses angular rate of the input device for at least one direction, an intensity calculation unit that calculates rotation intensity in a body frame based on the sensed angular rate, and an intensity mapping unit that maps the calculated rotation intensity to finally outputted rotation intensity by a mapping function.

BRIEF DESCRIPTION OF THE DRAWINGS

The above and other features and advantages of the present invention will become apparent by describing in detail preferred embodiments thereof with reference to the attached drawings in which.

DETAILED DESCRIPTION OF THE INVENTION

Exemplary embodiments of the present invention will be described in detail with reference to the accompanying drawings.

Advantages and features of the present invention and methods of accomplishing the same may be understood more readily by reference to the following detailed description of the exemplary embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims.

In the present invention, a user instruction input device refers to an interface device that makes various contents intuitively available by receiving the input of the user's movements. The device makes the information obtained through the user's movements correspond to information that is necessary for various information devices or various services. Some examples of such devices are a three-dimensional space mouse, an IPTV (Internet protocol TV) remote control and a game input device. Also, the object, for example, means an object existing within a virtual three-dimensional space expressed by a two-dimensional display screen. In the case of a baseball game application, the object may be a baseball within a virtual three-dimensional baseball playground. However, the objective of the present invention not only means an object in a virtual space, but also means an object in a system that can be transmitted the actual physical force and respond to the force.

Figure 1:
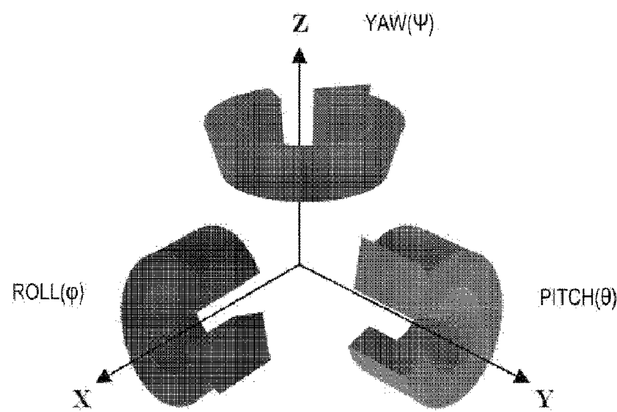
FIG. 1 illustrates a three-axis rotation angle defined in a certain frame.

FIG. 1 illustrates a three-axis rotation direction defined in a certain frame (coordinate system). In a certain frame consisting of x, y and z axes, a pitch ($\theta$) refers to a rotation in y-axis direction, a roll ($\phi$) refers to a rotation in x-axis direction, and a yaw ($\psi$) refer to a rotation in z-axis direction. Whether a rotation is positive (+) or negative (−) is determined by a right-handed coordinate. The present invention mentions two frames of a navigation frame and a body frame. The navigation frame is fixed on space and refers to a standard coordinate system consisting of three axes of $X_N$, $Y_N$ and $Z_N$. In FIG. 1, x-direction refers to a standard direction where the user instruction input device is toward. That is, it is a roll direction if a rotation is made based on the axis toward the standard direction.

Figure 2:
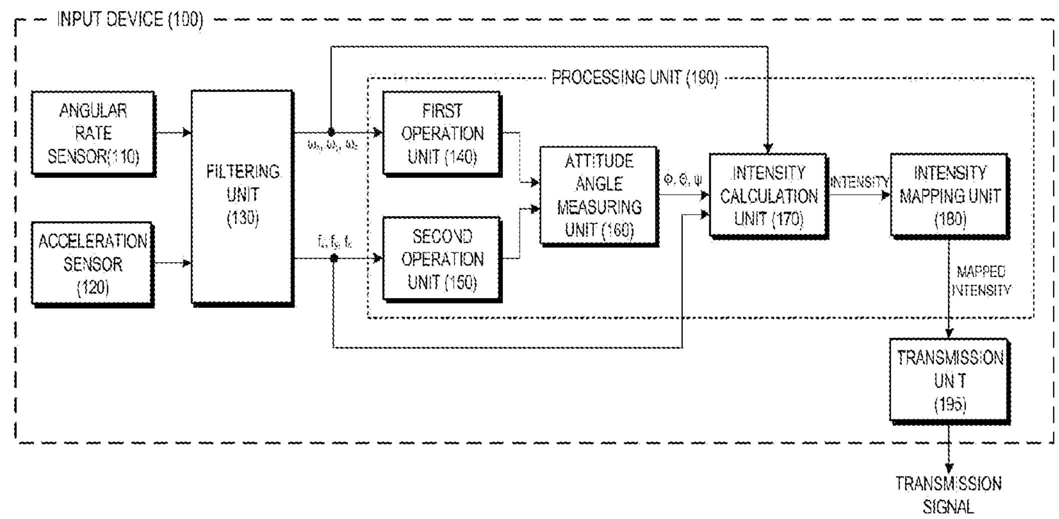
FIG. 2 is a block diagram illustrating an input device according to an exemplary embodiment of the present invention.

FIG. 2 is a block diagram illustrating an input device 100 according to an exemplary embodiment of the present invention. The input device 100 can control an object on at least one display device (not shown). Also the display device may be installed on a separate fixed position, but it may also be integrated with the input device 100 (e.g., a portable game machine).

As a more specific example, the input device 100 may include an angular rate sensor 110, an acceleration sensor 120, a filtering unit 130, a processing unit 190 and a transmission unit 195. Further, the processing unit 190 may include a first operation unit 140, a second operation unit 150, an attitude angle measuring unit 160, an intensity calculation unit and an intensity mapping unit 170.

The angular rate sensor 110 senses an angular rate at which the device 100 rotates on the body frame, and provides a sampled output value (digital value). A gyroscope can be used as angular rate sensor 110, and various types of gyroscopes such as a mechanical type, a fluid type, an optical type and a piezoelectric type. Specifically, the angular rate sensor 110 can obtain rotational angular rates for two axes (axes on the body frame) that cross at right angles, e.g., a rotational angular rate ($\omega_x$, $\omega_y$, $\omega_z$) on x-axis, y-axis and z-axis of the body frame.

The acceleration sensor 120 senses the acceleration of the input device 100 on the body frame and provides a sampled output value (digital value). The acceleration sensor 120 can be a piezoelectric type or a moving coil type. Specifically, the angular rate sensor 110 calculates the straight line acceleration ($f_x$, $f_y$, $f_z$) for three axes that cross at right angles (axes on the body frame).

The filtering unit 130 may consist of a low pass filter, a high pass filter, an offset filter or a scaling filter depending on the usage of the device 100, compensates for the error after receiving the output of the angular sensor 110 and the output of the acceleration sensor 120. The filtering unit 130 provides the error-compensated rotational angular rate ($\omega_x$, $\omega_y$, $\omega_z$) to the first operation unit 140 and provides the error-compensated acceleration ($f_x$, $f_y$, $f_z$) to the second operation unit 150.

The second operation unit calculates the roll, pitch and yaw of the navigation frame ($T_{XL}$, $\theta_{XL}$, $\phi_{XL}$) (the second rotational angle) using the acceleration ($f_x$, $f_y$, $f_z$) provided from the filtering unit 130. A specific example of the calculation is shown in the following equation.

$$\phi_{XL} = \arctan2(f_y, f_z)$$
$$\theta_{XL} = \arctan2(-f_x, (f_y^2 + f_z^2))$$
$$\psi_{XL} = \frac{\phi_{XL}}{\sin(\theta_{XL})} \quad \text{Equation 1}$$

Generally, the roll ($\phi_{XL}$) and the pitch ($\theta_{XL}$) can be simply calculated using the acceleration, but it is not easy to get the yaw. The yaw ($\psi_{XL}$) calculated equation 1 is a pseudo yaw and can be explained with reference to FIGS. 3 and 4.

Figure 3:
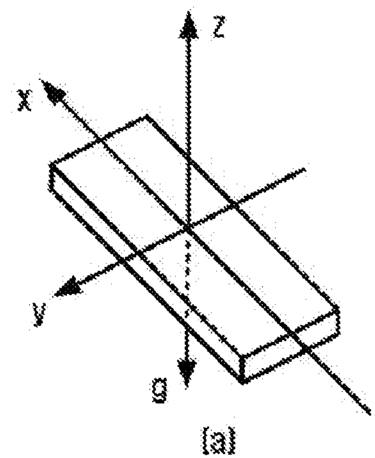
FIG. 3 illustrates a method of measuring a roll value using an accelerometer according to an exemplary embodiment of the present invention.
Figure 3:
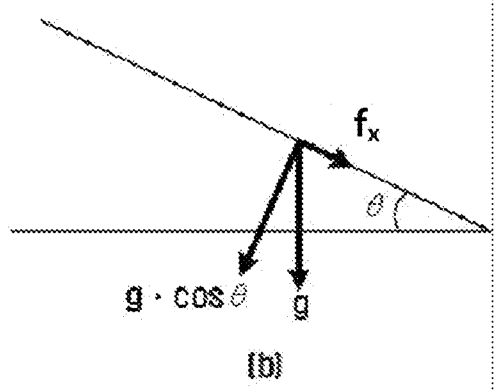
Figure 3:
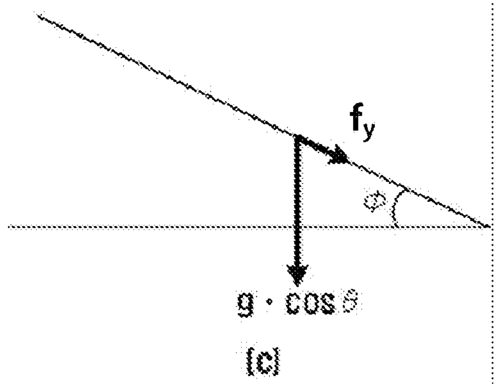

FIG. 3 illustrates a method of measuring the roll value using the accelerometer according to an exemplary embodiment of the present invention. Assuming that the acceleration direction is $f_y$, and the pitch has already been generated, the vertical element of acceleration of gravity becomes $g \cdot \cos\theta$ in (b) of FIG. 3. Hence, the equation of the roll is as follows.

$$\phi = \arcsin\left(\frac{f_y}{g \cdot \cos\theta}\right) \quad \text{Equation 2}$$

The method of measuring the roll value using the accelerometer can be calculated by various methods.

Figure 4:
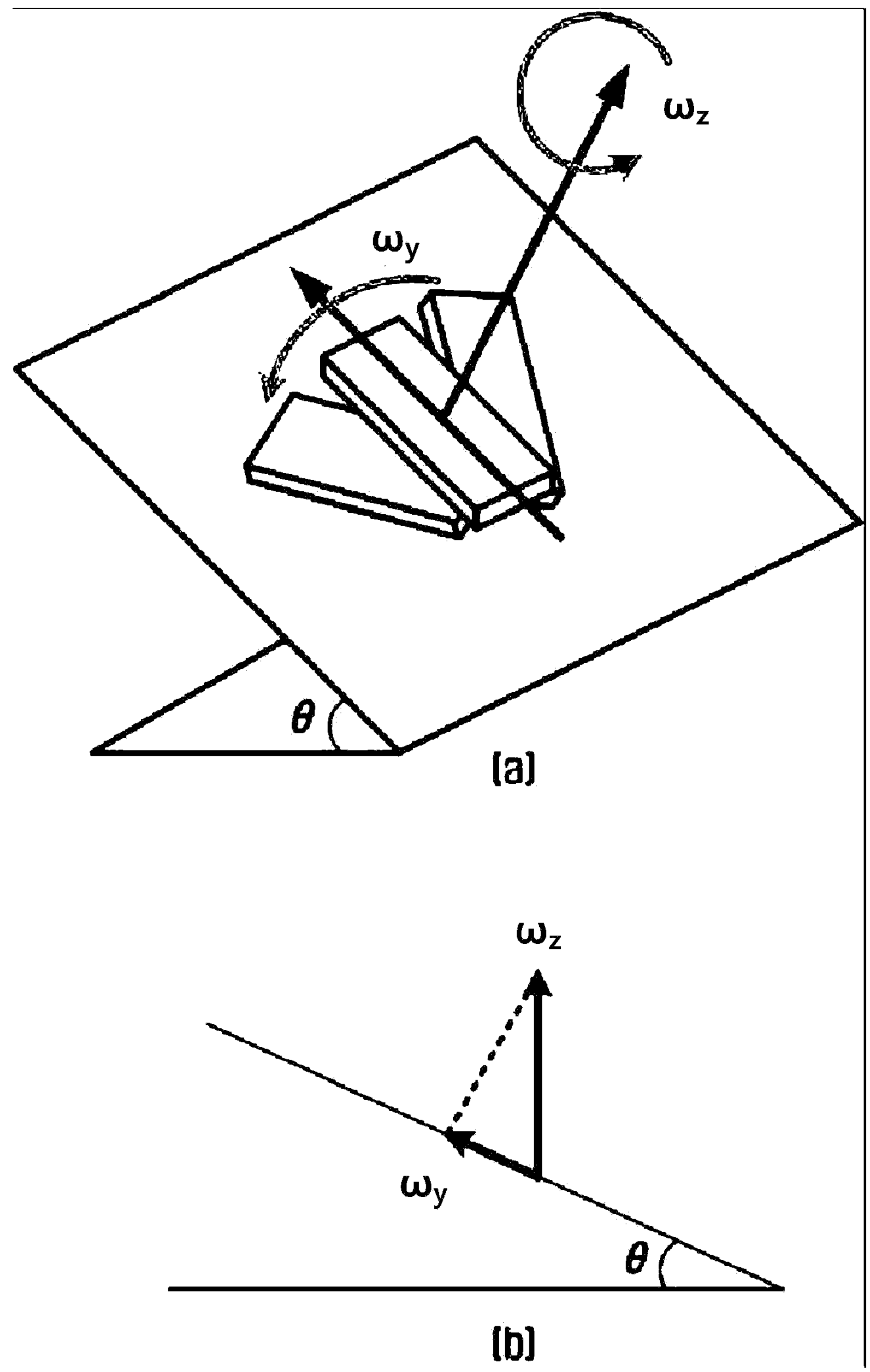
FIG. 4 illustrates a method of calculating a yaw value using the pitch and roll values in the method of measuring a yaw angle according to an exemplary embodiment of the present invention.

FIG. 4 illustrates a method of calculating a yaw value using the pitch and the roll values in the method of measuring the yaw angle according to an exemplary embodiment of the present invention. (a) of FIG. 4 shows a vector direction of the roll and yaw angular rates based on the generation of the pitch. In (a) of FIG. 4, $\omega_y$ represents the roll angular rate vector, and $\omega_z$ represents the yaw angular rate vector. The yaw angular rate vector is not the actual yaw vector, but the projected vector of the actual yaw vector.

(b) of FIG. 4 illustrates (a) of FIG. 4 from the side. In (b) of FIG. 4, assuming that the time is "t," the following equation 3 is established among the roll angular rate vector $\omega_y$, the yaw angular rate vector $\omega_z$ and the pitch ($\theta$).

$$\sin\theta(t) = \frac{\omega_y(t)}{\omega_z(t)} \quad \text{Equation 3}$$

From the above equation 3, the yaw ($\Psi$) can be approximated as shown in the equation 4.

$$\psi = \int \omega_z dt = \int \frac{\omega_y(t)}{\sin\theta(t)} \doteq \frac{1}{\sin\theta}\int \omega_y(t) = \frac{\phi}{\sin\theta} \quad \text{Equation 4}$$

Equation 4 cannot be applied if pitch θ is close to 0° or 90°, so a certain restriction should be given at such angles. The actually measured yaw values in each condition using equation 4 are shown in the following table.

| | Yaw (Ψ) measured at (−) pitch | | Yaw (Ψ) measured at (+) pitch | |
|---|---|---|---|---|
| Pitch (θ) | roll Φ = −80 | roll Φ = +80 | roll Φ = −80 | roll Φ = +80 |
| 10 | Strange movement | Strange movement | −414 | 383 |
| 20 | −222 | 243.5 | −221 | 241.5 |
| 40 | −120 | 125 | −122 | 127 |
| 60 | −89 | 91.5 | −92 | 94.5 |
| 80 | −72.5 | 77 | −83 | 84.5 |

As shown in the above table, as the roll changes, the yaw value changes, so the scale elements can be used to reduce such differences. Consequently, in the situation when there is a pitch value and both the roll value and the yaw value change, it is possible to calculate the approximate value for the yaw.

The first operation unit 140 calculates the rotation angle ($\phi_G$, $\theta_G$, $\psi_G$) (the first rotation angle) of three axes in the navigation frame using the angular rate values ($\omega_x$, $\omega_y$, $\omega_z$) provided from the filtering value 130. The specific equation using the Euler angle is shown in equation 5. Equation 5 has a form of a differential equation for the rotation angle ($\phi_G$, $\theta_G$, $\psi_G$) in the navigation frame.

$$\dot{\phi}_G = (\omega_y \sin\phi_G + \omega_z \cos\phi_G)\tan\theta_G + \omega_x$$
$$\dot{\theta}_G = (\omega_y \cos\phi_G - \omega_z \sin\phi_G)$$
$$\dot{\psi}_G = \frac{\omega_y \sin\phi_G + \omega_z \cos\phi_G}{\cos\theta_G} \quad \text{Equation 5}$$

Generally, the attitude angle in the navigation frame can be obtained using three angular rates. The desirable embodiment of the present invention calculates angular rates of three axes in the navigation frame using only two angular rates ($\omega_y$, $\omega_z$), and here $\omega_x$ of equation 5 is a problem.

General hand and arm movements of a person are often based on a single axis motion in a three-axis coordinate system. Some such examples are rotation on Z-axis and rotation in Y-axis direction. Also, even though there are two or more composite movements at the same time, there is a tendency that when X-axis and Y-axis rotations of the body frame and X-axis and Z-axis rotations of the body frame occur at the same time, movements in the X-axis direction become relatively smaller than those in Y-axis and Z-axis directions.

Hence, in equation 5, $\omega_x$ in X-axis direction becomes relatively smaller than that in Y-axis direction or Z-axis direction, so $\omega_x$ may be disregarded, but the calculation is not done accurately. However, if the roll ($\phi_{XL}$) information calculated by the accelerometer is appropriately used, a performance, which is similar to that when the angular rate of $\omega_x$ is used, can be secured.

Figure 5:
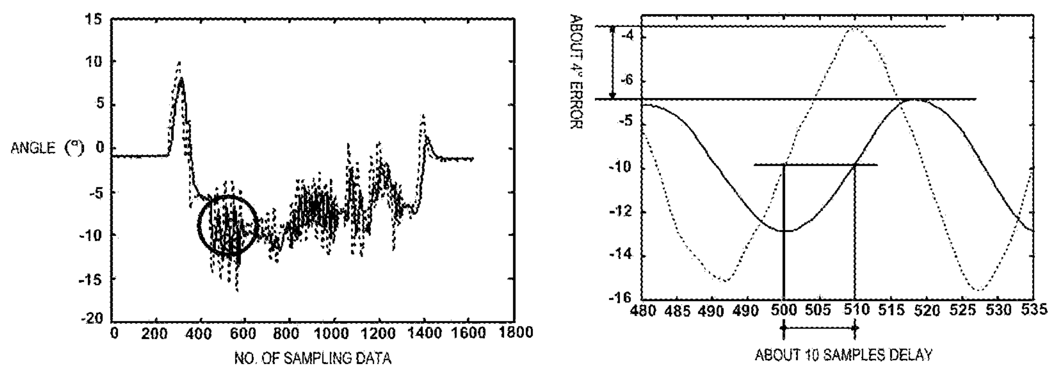
FIGS. 5 to 7 show the case when $\omega_x$ is used and the case when $\omega_x$ is not used in equation 5.
Figure 6:
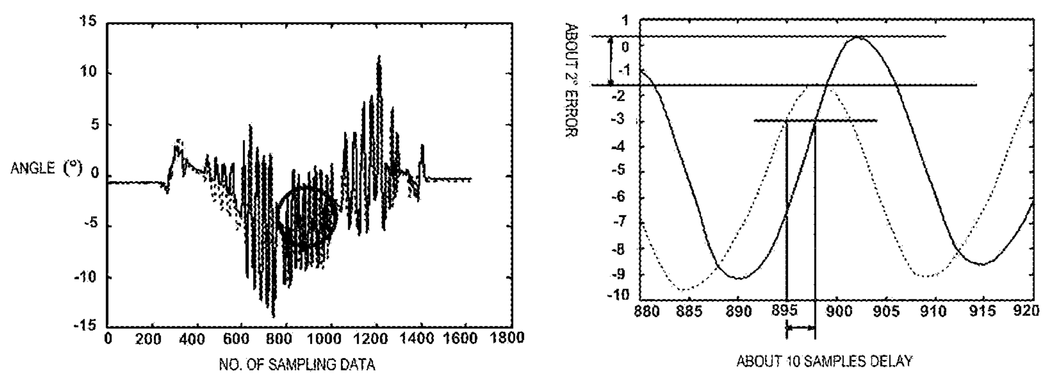
Figure 7:
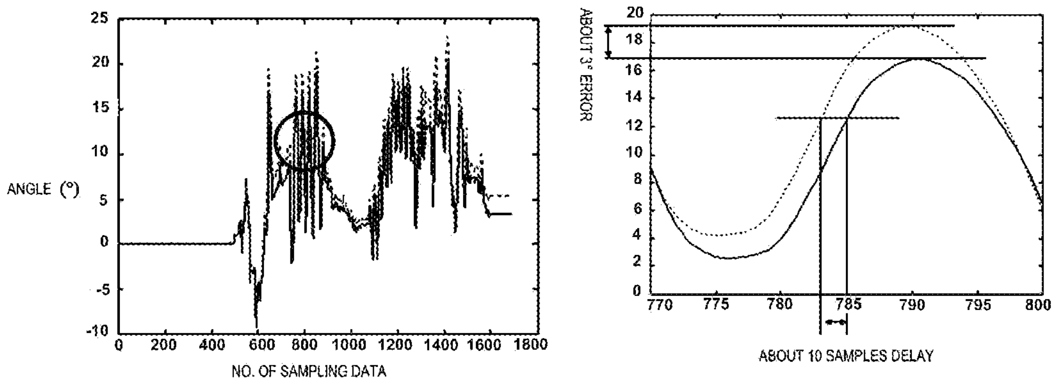

FIGS. 5-7 are the result of comparing the case of using $\omega_x$ (dotted line) and the case of not using $\phi_x$ (solid line). The X-axis represents the number of unit samples, and Y-axis represents the angle. Also, the right side graph of each drawing is an extended view of a certain section indicated by a circle in the left side graph. When $\omega_x$ is removed, there is an 2°~4° difference and a delay of 2 to 10 samples than when $\omega_x$ is not removed. However, if the calculation period is more than 100 Hz, the angular difference and the delay are not easily distinguishable by the user, so there is no significant difference in the result between when using the angular rate for two axes (Y-axis angular rate and Z-axis angular rate of the body frame) and when using the angular rates for the three axes.

Based on such an experiment result, equation 5 can be transformed to the following equation 6.

$$\dot{\phi}_G = (\omega_y \sin\phi_G + \omega_z \cos\phi_G)\tan\theta_G$$
$$\dot{\theta}_G = (\omega_y \cos\phi_G - \omega_z \sin\phi_G)$$
$$\dot{\psi}_G = \frac{\omega_y \sin\phi_G + \omega_z \cos\phi_G}{\cos\theta_G} \quad \text{Equation 6}$$

Further, if a pattern when a person grabs the input device and moves is recognized in advance and is utilized, even $\omega_y$ can be removed. Here, as in equation 1, errors generated by not using $\omega_y$, $\omega_z$ can be overcome by using ($\phi_{XL}$, $\theta_{XL}$, $\psi_{XL}$) calculated using the output of the accelerometer.

Equations 5 and 6 illustrate the calculation of the rotation angle ($\phi_G$, $\theta_G$, $\psi_G$) of three axes in the navigation frame from the angular rate ($\omega_y$, $\omega_z$) based on the Euler angle representation, but the calculation may be performed based on the more involved quaternion angle representation instead of Euler angle.

Referring to FIG. 2, the attitude angle measuring unit 160 calculates the weighted average of three rotation angles ($\phi_{XL}$, $\theta_{XL}$, $\psi_{XL}$) on the navigation frame obtained from the second operation unit 150 and the three rotation angles ($\phi_G$, $\theta_G$, $\psi_G$) on the navigation frame obtained from the first operation unit 140, and calculates the attitude angle ($\phi$, $\theta$, $\psi$) in the navigation frame. The specific weighted average can be calculated according to the following equation 7.

$$\phi=\alpha_1\cdot\phi_{XL}+(1-\alpha_1)\cdot\phi_G$$
$$\theta=\alpha_2\cdot\theta_{XL}+(1-\alpha_2)\cdot\phi_G$$
$$\theta=\alpha_3\cdot\psi_{XL}+(1-\alpha_3)\cdot\psi_G \quad \text{Equation 7}$$

Here, $\alpha_1$, $\alpha_2$ and $\alpha_3$ are weights for $\phi$, $\theta$ and $\psi$, respectively. The above process to calculate the attitude angle in the navigation is just an example, but various other ways can be used to calculate the attitude angle. For example, $\psi_{XL}$, used in equation 1 can be calculated using a magnetic sensor or an image sensor. According to the magnetic sensor or the image sensor, because a reentering angle in the navigation frame can be directly calculated, a transformation process as in equation 1 used in the acceleration sensor may not be necessary.

If $\phi_{XL}$, is not calculated from the third formula of equation 1, i.e., $\theta_{XL}=0$, by setting $\alpha_3$ to 1, $\psi$ can be calculated only by $\psi_G$ without using $\theta_{XL}$.

However, in order to calculate the final attitude angle ($\phi$, $\theta$, $\psi$) more accurately, $\alpha_1$, $\alpha_2$ and $\alpha_3$ need to be adaptively determined rather than arbitrarily determined. For this, the “attitude angle measuring” angle 160 can use a movement estimation function.

The movement estimation function refers to a function that detects detailed movements by normalizing movements to the range between 0 and 1 based on data using the outputs of the angular rate sensor and the acceleration sensor. As an example, in the case where movements of the detected input device 100 are hardly noticeable, the value of the acceleration sensor 120 is more reliable, so the mapping is done so that $\alpha_n=1$, and in the case where the movements are the maximum state, the value of the angular rate sensor 110 is more reliable, so the mapping is done so that $\alpha_n=0$. In the case where the movements are between the hardly noticeable state and the maximum state, the mapping should be done with an appropriate value.

Figure 8:
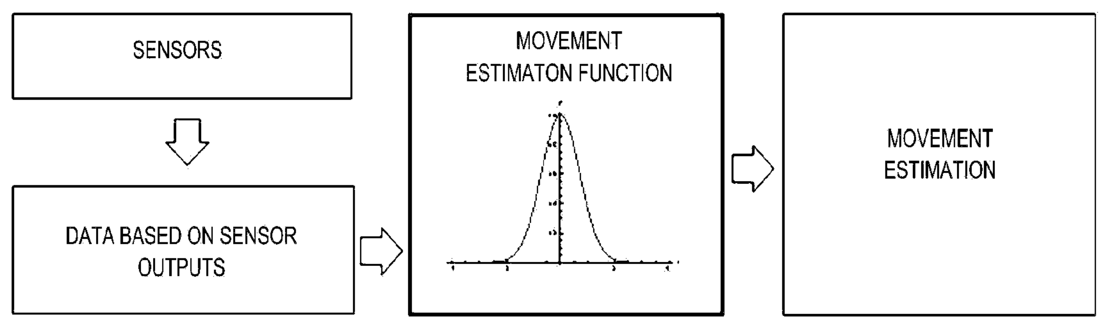
FIG. 8 is flowchart estimating movements of the device using a movement estimation function.
Figure 9:
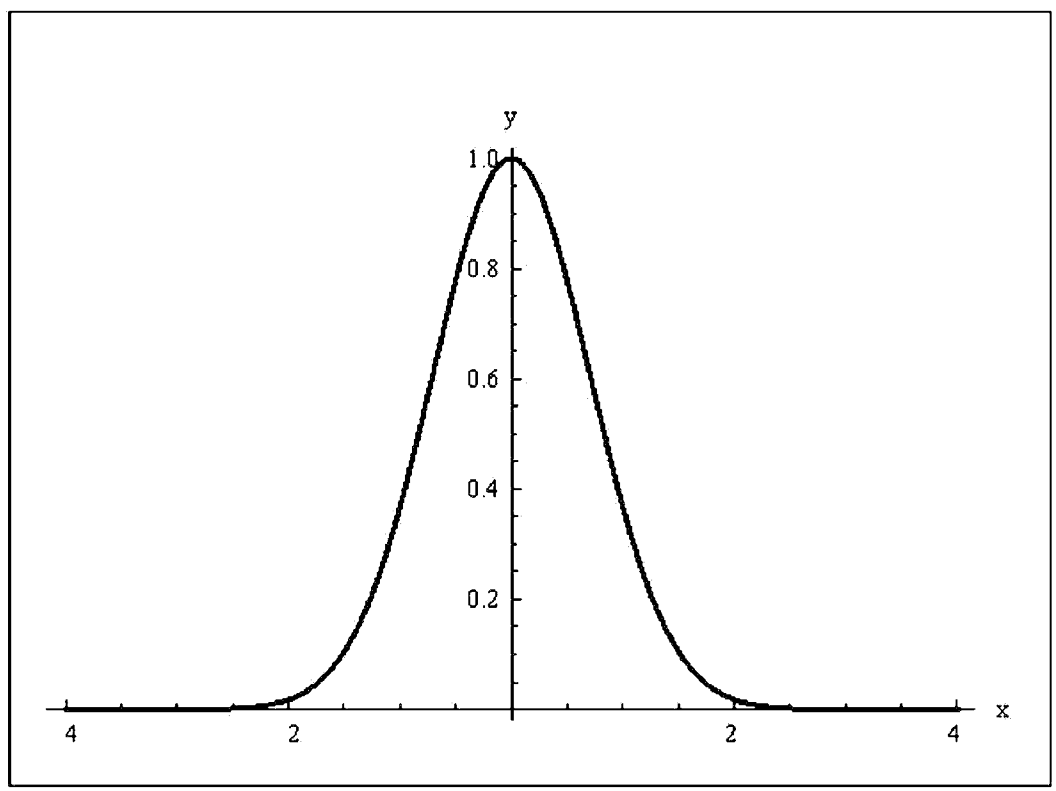
FIG. 9 shows a bell-shaped curve as a movement estimation function.
Figure 10:
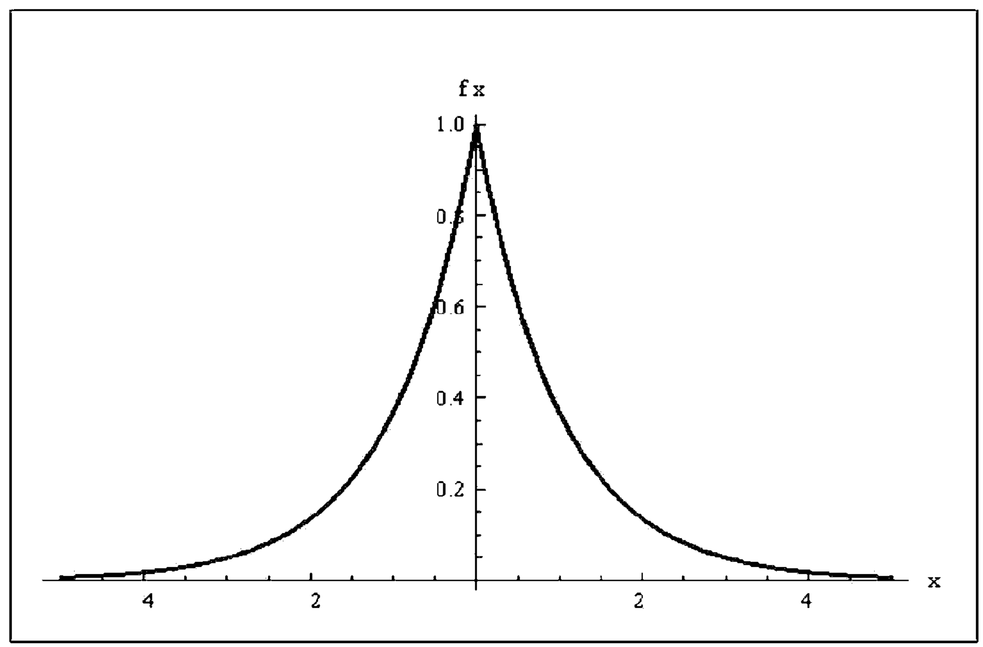
FIG. 10 shows an exponential function used as a movement estimation function.

FIG. 8 is a flowchart for estimating movements of the input device 100 using a movement estimation function. A bell shape curve or an exponential function may be used as a movement estimation function. The bell shape curve, as a curve in the form shown in FIG. 9, may be expressed by Gaussian function, a raised cosine function, etc. Further, the exponential function has the form shown in FIG. 10, and is, e.g., $y=e^{-|x|}$. In FIGS. 9 and 10, x-axis represents the size of movements of the device 100, and y-axis represents the weight in equation 7, i.e., $\alpha_n$. Functions of FIGS. 9 and 10 commonly have the peak value in the center, and have the form approaching 0 as they go right or left.

By using such a movement estimation function, detailed movements such as stoppage, minute movements, slow movements and fast movements can be detected in addition to detecting whether the input device 100 has stopped. Further, by measuring such movements, the basis for removing unintended movements (e.g., a cursor movement by a trembling of a hand) can be provided. Further, it is possible to adjust the scale of a mapping function according to the size of movements, which will be explained later.

Referring to FIG. 2 again, the intensity calculation unit 170 calculates force intensity ($F^x$, $F^y$, $F^z$) based on the attitude angle ($\phi$, $\theta$, $\psi$) obtained in the attitude measuring unit 160, i.e., the angle formed by the input device 100 on the navigation frame fixed on the space, and error-compensated straight line acceleration ($f_x$, $f_y$, $f_z$) provided in the filtering unit 130. Further, the intensity calculation unit 170 calculates rotation intensity ($R_x$, $R_y$, $R_z$) based on the attitude angle ($\phi$, $\theta$, $\psi$) obtained from the attitude measuring unit 160 and the error-compensated rotation angular rate ($\omega_x$, $\omega_y$, $\omega_z$) provided from the filtering unit 130. Of course, the intensity calculation unit 170 can calculate the force intensity and rotation intensity together.

The first exemplary embodiment will be explained in detail in the following.

The force intensity refers to various force elements that can be implemented in the input device 100. If the attitude angle is estimated in a three-dimensional space, the force intensity, the force given to the three-dimensional space using the output of the accelerometer, can be calculated. However, the force intensity can be divided into the following three types according to the selection of the frame (coordinate system), which are the force intensity ($F_B$) defined in the body frame, the force intensity ($F_N$) defined in the navigation frame, and the force intensity defined in the yaw drift frame ($F_Y$). The $F_B$ can be divided into elements of each axis, which are $F_B^x$, $F_B^y$, $F_B^z$, $F_N$ can be divided into elements of each axis, which are $F_B^x$, $F_B^y$, $F_B^z$, and $F_Y$ can be divided into elements of each axis, which are $F_Y^x$, $F_Y$y, $F_Y^z$. The yaw drift frame is basically similar to the navigation frame, but is a frame that does not consider the yaw direction rotation (based on the body frame) in the navigation frame. That is, the force intensity in the yaw drift frame may mean the force intensity in the navigation frame according to the heading direction of the input device 100. It can be understood that the yaw drift frame may belong to frames independent of the attitude of the input device 100 along with the navigation frame.

Here, the straight line acceleration elements ($f_x$, $f_y$, $f_z$) outputted from the filtering unit 130 are values defined in the body frame, so the intensity calculation unit 170 can simply calculate force intensity ($F_B^x$, $F_B^y$, $F_B^z$) on the body frame through appropriate scaling on the acceleration element. Also, the intensity calculation unit 170 can calculate force intensity ($F^x$, $F^y$, $F^z$) in the coordinate system (frame) independent of the attitude of the input device 100 based on the attitude angle (φ, θ, ψ) obtained from the attitude measuring unit 160 and the straight line acceleration element ($f_x$, $f_y$, $f_z$).

In the dependent coordinate system, the force intensity ($F^x$, $F^y$, $F^z$) can be, for example, the force intensity ($F_N^x$, $F_N^y$, $F_N^z$) in the navigation frame or the force intensity ($F_Y^x$, $F_Y^y$, $F_Y^z$) in the yaw drift frame. The force intensity calculated by the intensity calculation unit 170 may or may not include the gravity compensation depending on the applied application.

Figure 11:
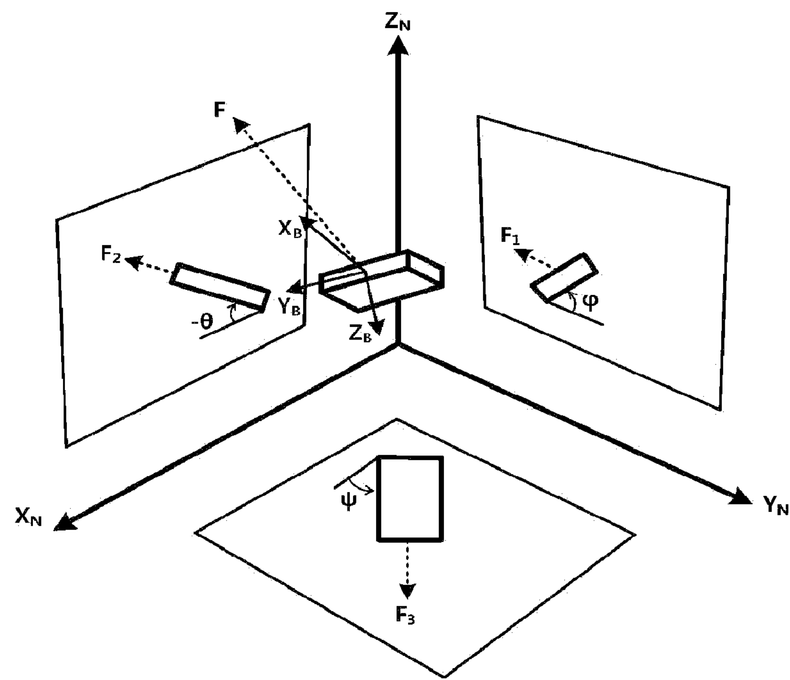
FIG. 11 is a view that has projected the force intensity vector of the body frame on each plane of the navigation frame.

FIG. 11 shows the relation between the attitude angle (φ, θ, ψ) and force elements ($F_1$, $F_2$, $F_3$) that projected a force intensity vector (F) of the body frame consisting of three axes ($X_B$, $Y_B$, $Z_B$) on each plane of the navigation frame consisting of three axes ($X_N$, $Y_N$, $Z_N$).

Figure 12:
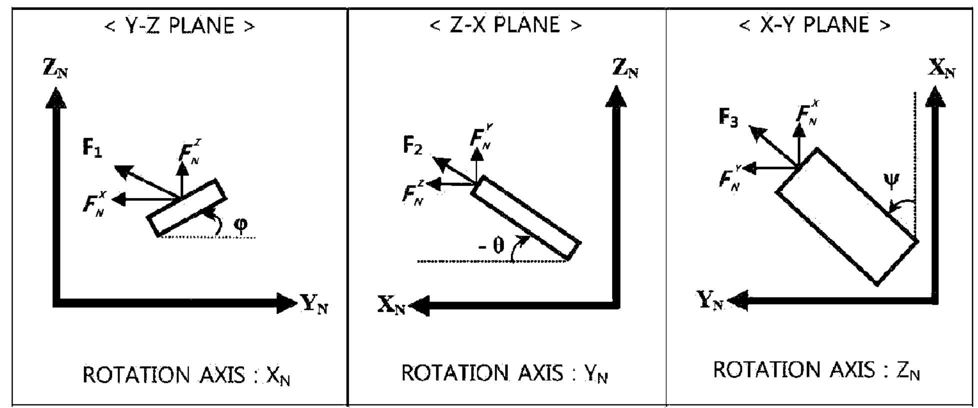
FIG. 12 is a view that has decomposed force elements projected in FIG. 11 as navigation frame elements using the attitude angle.

FIG. 12 shows the case where the projected force elements ($F_1$, $F_2$, $F_3$) are respectively decomposed as elements of three axes ($X_N$, $Y_N$, $Z_N$) of the navigation frame using the attitude angle (φ, θ, ψ). If each axis ($X_N$, $Y_N$, $Z_N$) element is added, finally the force intensity ($F_N^x$, $F_N^y$, $F_N^z$) in the navigation frame can be calculated.

Based on the geometric relation illustrated in FIGS. 11 and 12, the conversion equation that converts the force intensity ($F_B^x$, $F_B^y$, $F_B^z$) in the body frame into the force intensity ($F_N^x$, $F_N^y$, $F_N^z$) of the navigation frame can be obtained, and is shown in equation 8.

$$F_N = C_B^N F_B \qquad \text{Equation 8}$$

wherein, $$C_B^N = \begin{bmatrix} \cos(\psi)\cos(\theta) & \begin{pmatrix} \cos(\psi)\sin(\theta)\sin(\phi) \\ -\sin(\psi)\cos(\phi) \end{pmatrix} & \begin{pmatrix} \cos(\psi)\sin(\theta)\cos(\phi) \\ +\sin(\psi)\sin(\phi) \end{pmatrix} \\ \sin(\psi)\cos(\theta) & \begin{pmatrix} \sin(\psi)\sin(\theta)\cos(\phi) \\ +\cos(\psi)\cos(\phi) \end{pmatrix} & \begin{pmatrix} \sin(\psi)\sin(\theta)\cos(\phi) \\ -\cos(\psi)\sin(\phi) \end{pmatrix} \\ -\sin(\theta) & \cos(\theta)\sin(\phi) & \cos(\theta)\cos(\phi) \end{bmatrix}$$

Here, $F_N$ is a three-dimensional vector consisting of force intensity elements ($F_N^x$, $F_N^y$, $F_N^z$) in the navigation frame, and $F_B$ is a three-dimensional vector consisting of force intensity elements ($F_B^x$, $F_B^y$, $F_B^z$) in the navigation frame.

Figure 13A:
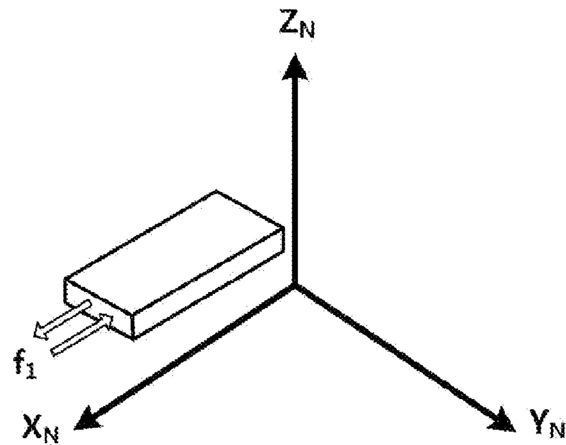
FIGS. 13A and 13B show differences of force intensity between the body frame and the navigation frame.
Figure 13B:
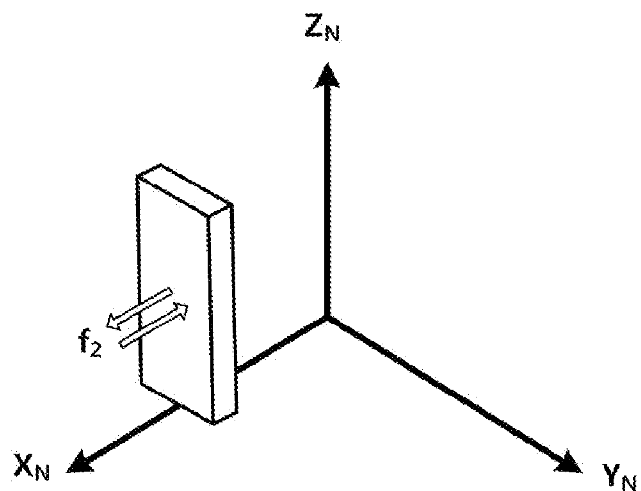

FIGS. 13A and 13B show the difference of force intensity between the body frame and the navigation frame. FIG. 13A FIG. 13A is the case of making the direction of the body frame coincide with the direction of the navigation frame, and giving force ($f_1$) in x-axis direction, and FIG. 13B is the case of making the input device 100 stand up at 90°, and giving force ($f_2$) in z-axis direction (x-axis direction in the navigation frame) of the body frame.

Figure 14:
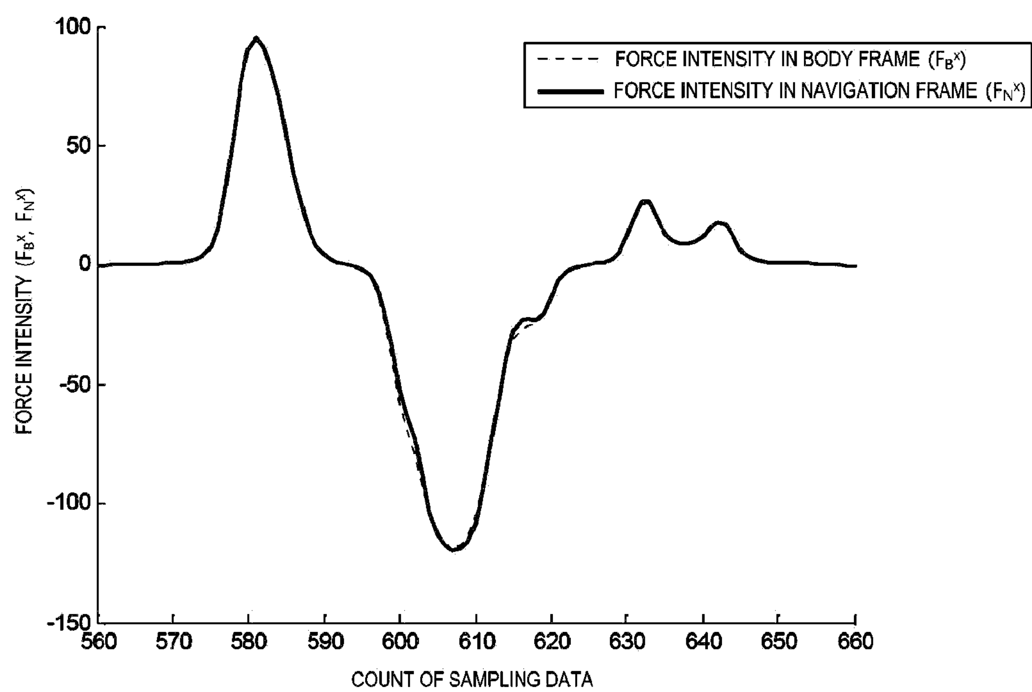
FIG. 14 shows the result of the force intensity in the condition same as that of FIG. 13A.

FIG. 14 shows the result of the force intensity in the same condition as that of FIG. 13A. As expected, the force intensity ($F_B^x$) in x-axis direction in the body frame and the force intensity ($F_N^x$) in x-axis direction in the navigation frame almost coincide with each other.

Figure 15:
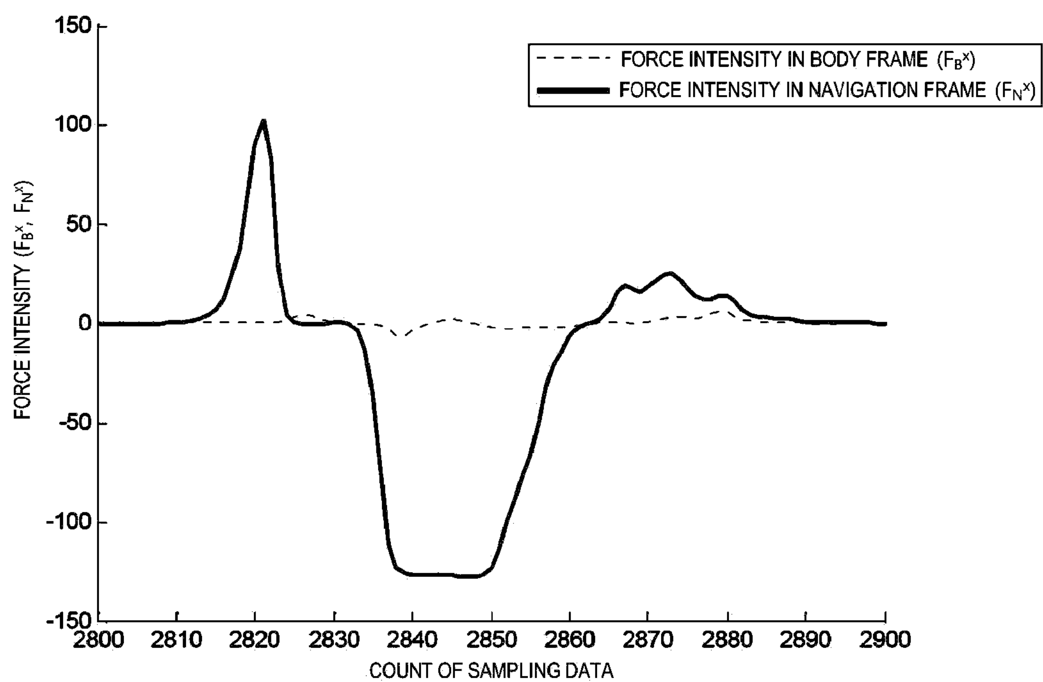
FIGS. 15 and 16 show the result of the force intensity in the condition same as that of FIG. 13B.
Figure 16:
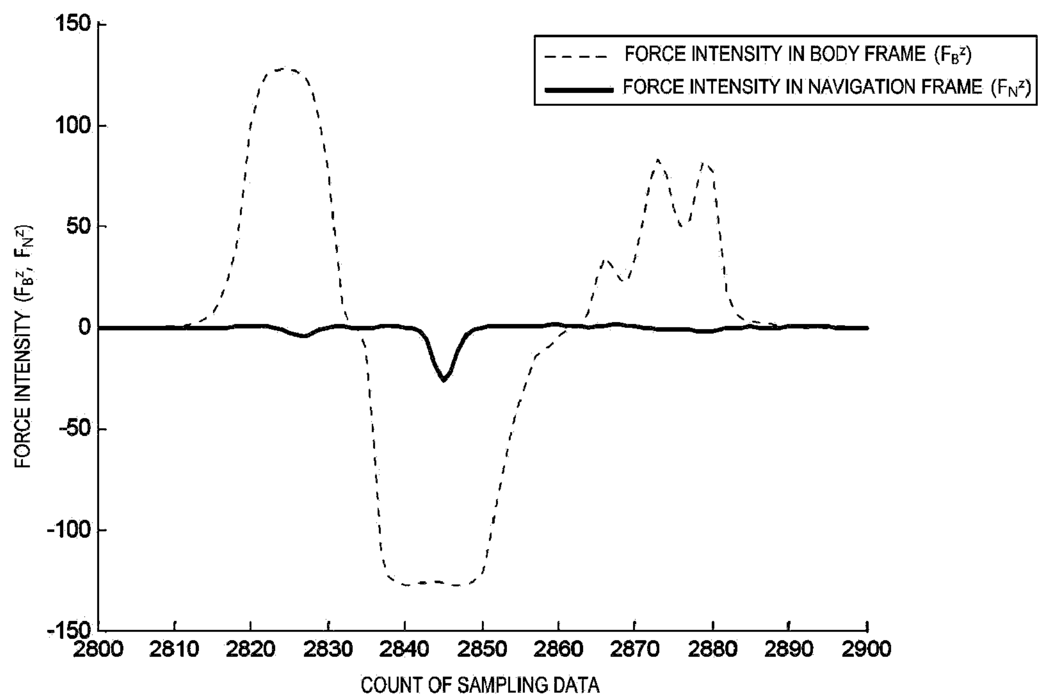

Further, FIGS. 15 and 16 show the result of force intensity in the same condition as that of FIG. 13B. Especially, FIG. 15 compares force intensities in x-axis direction in the body frame and the navigation frame. In FIG. 15, the force intensity ($F_N^x$) in the navigation frame refers to the profile according to the given force, and the force intensity ($F_B^x$) in the body frame keeps a value close to 0 regardless of the time (counts of sampling data). Theoretically, the force intensity ($F_B^x$) of the body frame should exactly keep 0, but 0 is not kept due to trembling of the hand or errors in the accelerometer.

FIG. 16 compares and shows the force intensity ($F_B^z$, $F_N^z$) in z-axis direction in the body frame and the navigation frame. In FIG. 16, the force intensity ($F_B^x$) of the body frame shows the profile according to the given force. On the other hand, the force intensity ($F_N^x$) of the navigation frame has some errors in some sections, but keeps a value close to 0. Likewise, the result converted according to equation 8 is not very different from the theoretical estimation.

Further, equation to convert the force intensity in the body frame ($F_B^x$, $F_B^y$, $F_B^z$) into the force intensity ($F_Y^x$, $F_Y^y$, $F_Y^z$) in the yaw drift frame is shown in the following equation 9.

$$F_Y = C_B^Y F_B \qquad \text{Equation 9}$$

wherein, $$C_B^Y = \begin{bmatrix} \cos(\theta) & \sin(\theta)\sin(\phi) & \sin(\theta)\cos(\phi) \\ 0 & \cos(\phi) & -\sin(\phi) \\ -\sin(\theta) & \cos(\theta)\sin(\phi) & \cos(\theta)\cos(\phi) \end{bmatrix}$$

The equation 9 can be easily obtained by using 0 for ψ in equation 8 because the yaw drift frame is considered 0 even though there in yaw rotations in the navigation frame in that the yaw drift frame does not consider yaw rotation.

The conversion matrix ($C_B^N$) that converts the force intensity of the body frame into the force intensity of the navigation frame or the conversion matrix ($C_B^Y$) that converts the force intensity of the body frame into the force intensity of the yaw drift frame consist of the combinations of φ, θ and ψ. Hence, it is very important to get the accurate attitude angle of the input device 100, i.e., φ, θ and ψ in determining force intensity of the independent frame in the attitude of the input device 100. Even though very accurate force intensity is obtained in the body frame, if the attitude angle is not accurate, the accuracy of the converted force intensity will be lowered. Hence, it is very important to obtain a more accurate attitude angle according to equations 1 to 7.

The force intensity naturally includes gravity acceleration elements. However, the gravity acceleration elements may need to be included depending on the application that uses the input device 100, or the gravity acceleration elements may need to be removed. The gravity acceleration is determined by the roll and the pitch among the attitude angle of the navigation frame. Hence, the calculation of the accurate attitude angle is essentially necessary in removing gravity acceleration elements without errors.

Referring to FIG. 2 again, the intensity mapping unit 180 maps the force intensity (F) obtained from the intensity calculation unit 170 to the force intensity (F') finally outputted by the mapping function. The force intensity (F) may include $F_N$ or $F_Y$.

Figure 17A:
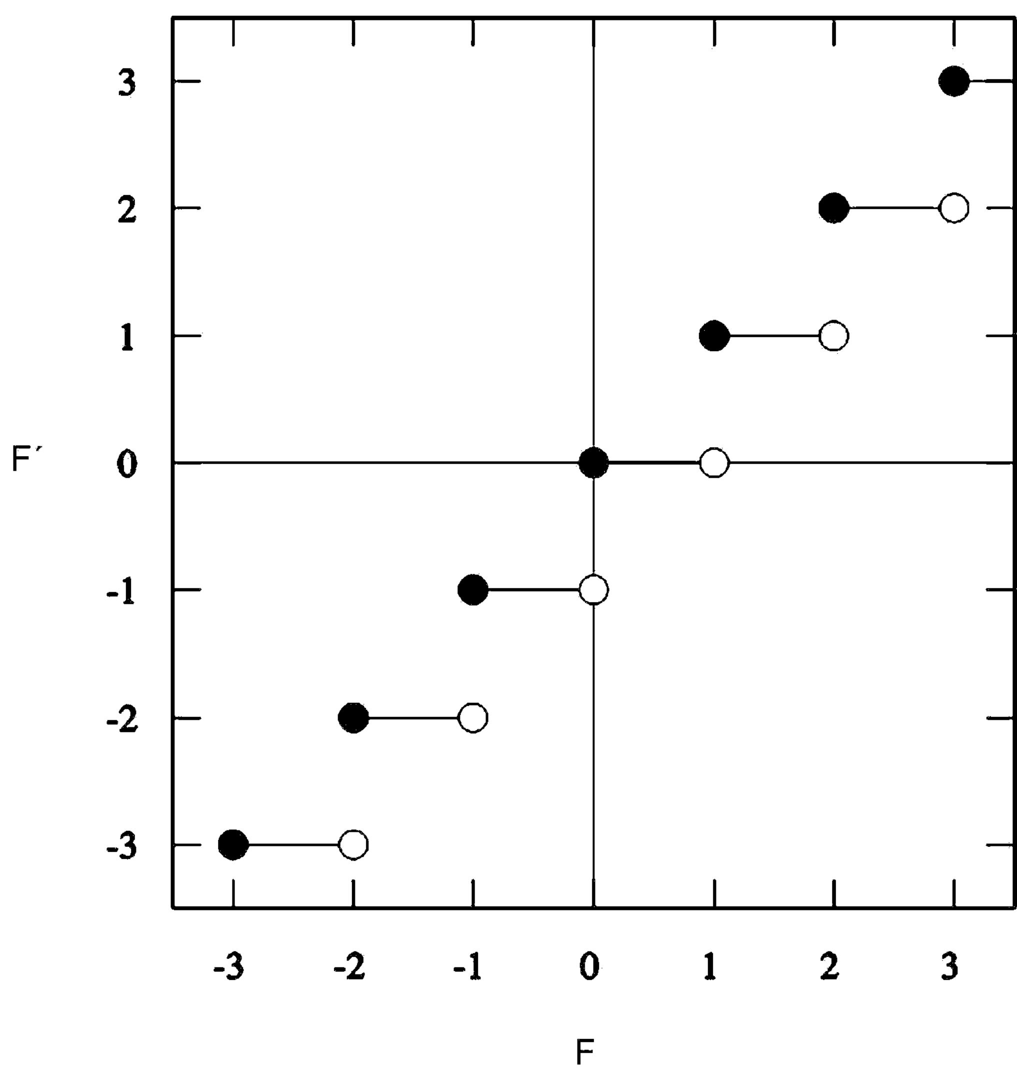
FIGS. 17A, 17B and 18 show mapping functions according to an exemplary embodiment of the present invention.
Figure 17B:
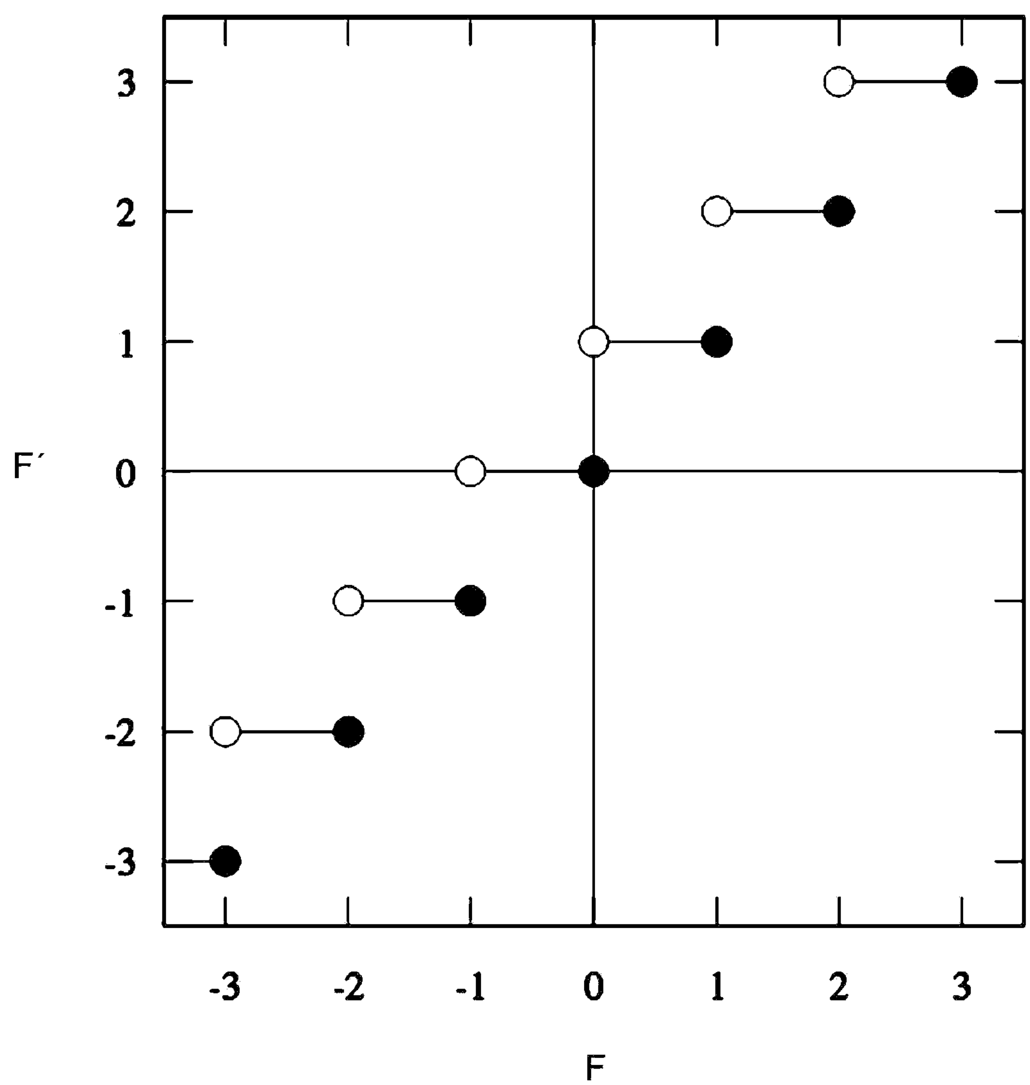

FIGS. 17A and 17B show examples of simple mapping functions. Here, FIG. 17A shows a floor function having the form of $f(t)=\lfloor kt \rfloor$, and FIG. 17B shows a ceiling function having the form of $f(t)=\lceil kt \rceil$. Such mapping functions can make input force intensity (F) correspond to output force intensity (F') by a simple relation. Here, the input value of functions can be reduced or removed depending on the change of "K", and an input value more than a certain value can be converted into a proportional output value. However, the mapping functions such as FIGS. 17A and 17B have a disadvantage that output values cannot be appropriately limited for excessive input values more than a certain value. That is, the mapping function of FIGS. 17A and 17B do not have the function of the limitation area among the functions of the depression area, the scaling area and the limitation area included in the mapping function.

Figure 18:
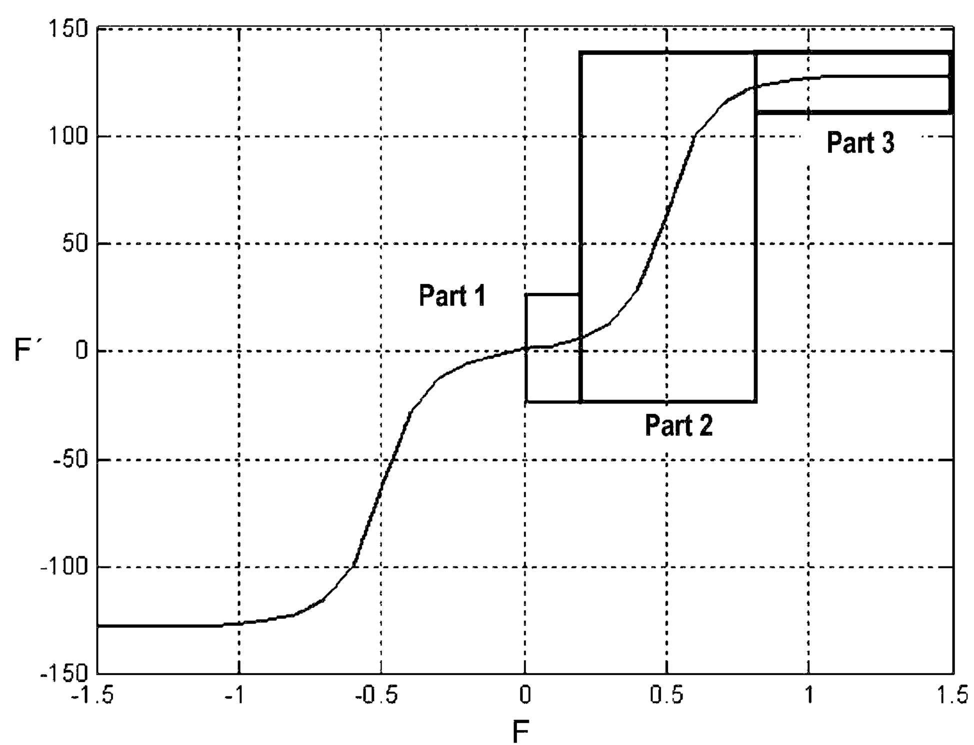

The mapping function of FIG. 18 is divided into three areas, which is more complicated than the functions of FIGS. 17A and 17B. The first area (part 1) is a depression area that does the mapping after reducing the input value of the function. The second area (part 2) is a scaling area that maps the input value to a roughly proportional output value. Finally, the third area is a limitation area that limits the output value for the input more than a certain value.

An example of mapping functions of FIG. 18 is Sigmoid function such as $$f(t) = \frac{1}{1 + e^{-t}}.$$

Here, there are both positive and negative force directions, so the Sigmoid function is symmetrical on the starting point of the coordinates. That is, the mapping function of FIG. 18 is made of combination of the same two Sigmoid functions.

The meaning of three areas of FIG. 18 is explained in more detailed in the following. The first depression area is an area where the user's force applications are minute. In this area, the intensity of input force (F) is not mapped with the intensity of output force (F') by 1:1, but the mapping is done by reducing the intensity of output force (F'), which provides the function that removes unintended movements such as a trembling of a user's hand. However, in applications that need implementation of minute movements, such movements can be made to be expressed by raising up the depression area.

The second scaling area is an area that proportionally maps actual user force intensity to position information on the display device, and the mapping can be done by, e.g., ±128 integer values.

Likewise, the mapping function in the present invention may include, for example, functions illustrated in FIGS. 17A and 17B, but are not limited to the functions. For example, the mapping function of the present invention may include at least two of the three areas, which are a depression area that reduces or removes and outputs inputs values of the function, a scaling area that maps the input value of the function to a roughly proportional output value, and a limitation area that limits the output value for input values more than a certain value. In this perspective, functions of FIGS. 17A and 17B may be considered formed of a depression area and a scaling area, and the function of FIG. 18 may be considered formed of a depression area, a scaling area and a limitation area.

Figure 19:
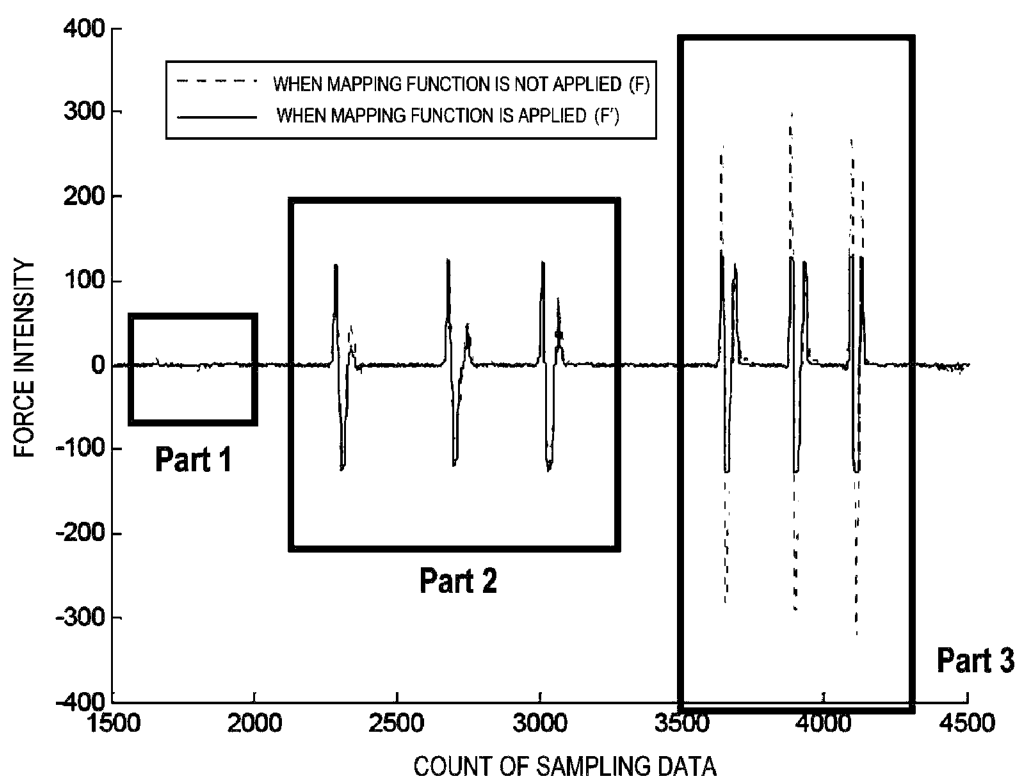
FIG. 19 shows force intensity of the output according to the application of the mapping function as in FIG. 18 in a condition that a user gives force to an input device.

FIG. 19 shows force intensity of the output according to the mapping function of FIG. 18 in a condition that the user gives force (or acceleration) to the input device 100 as in FIG. 13A. Here, the first area (part 1) is the state where a user keeps grabbing an input device 100, the second area (part 2) is the state where appropriate force is given, and the third state (part 3) is the state where strong force is given. Referring to FIG. 19, the depression function is provided in the first area, the scaling function is provided in the second area, and the limitation function is provided in the third area.

Figure 20:
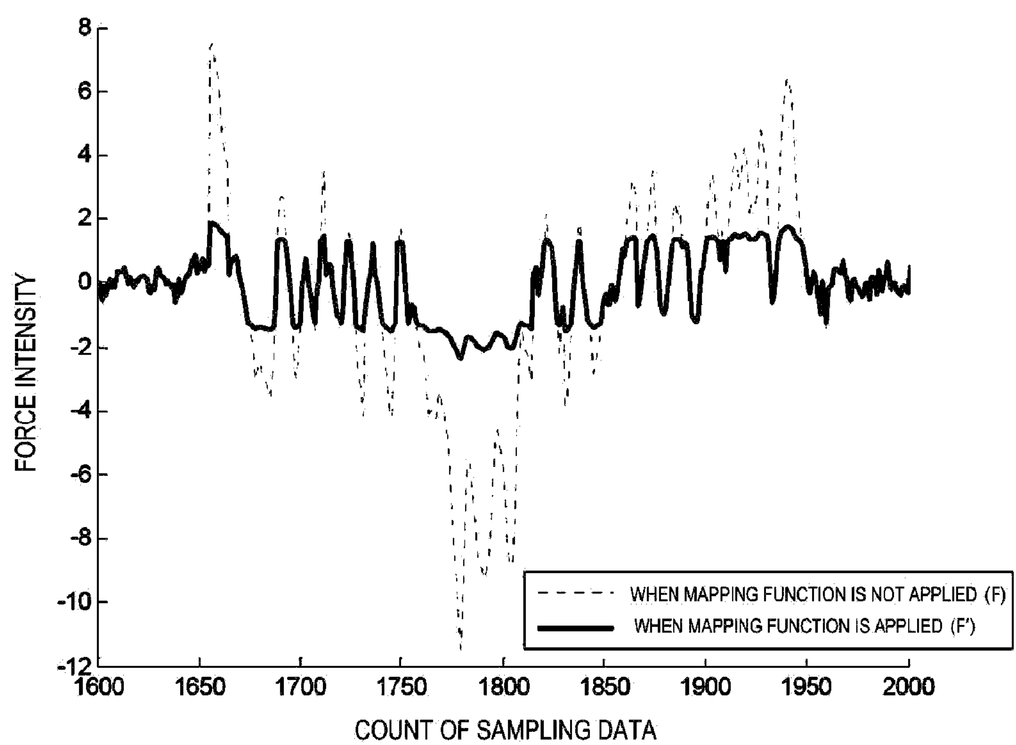
FIG. 20 is an extended view of a depression area of FIG. 19.
Figure 21:
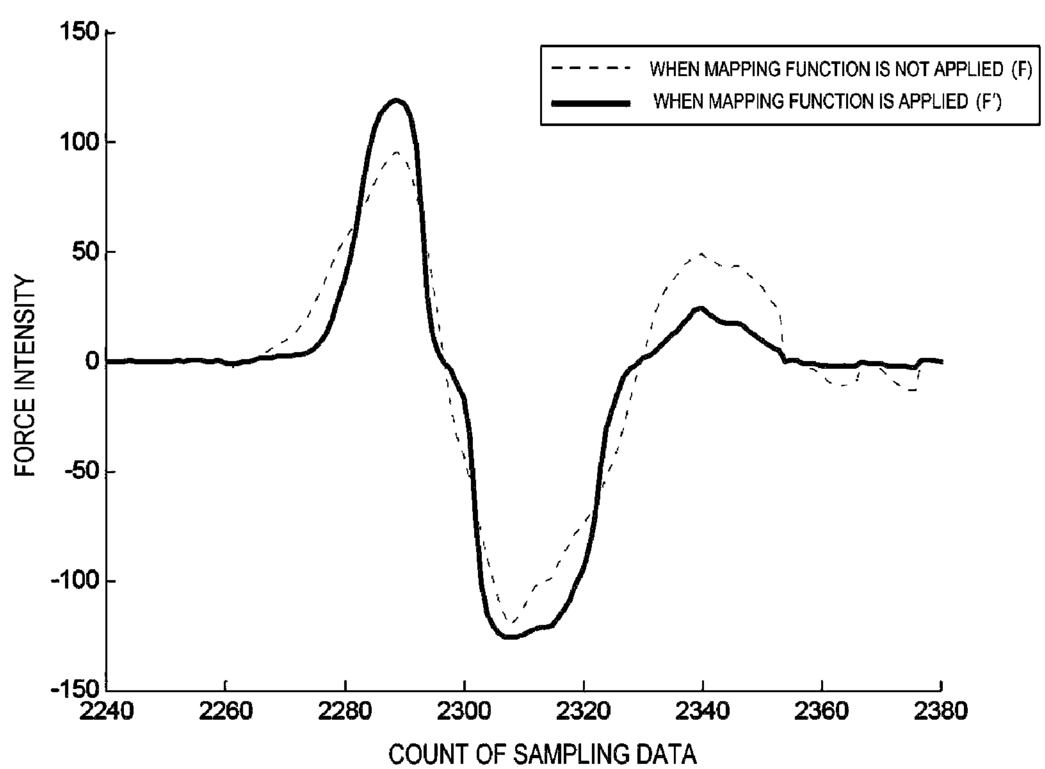
FIG. 21 is an extended view of a scaling area of FIG. 19.
Figure 22:
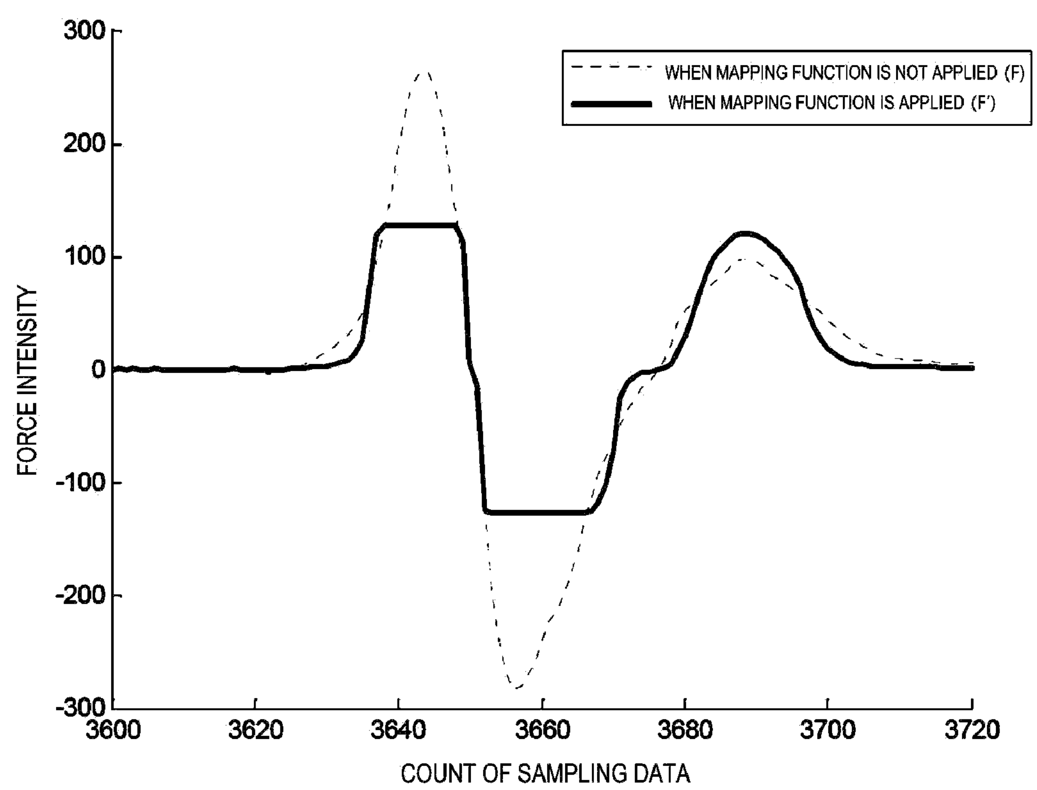
FIG. 22 is an extended view of a limitation area of FIG. 19.
Figure 23:
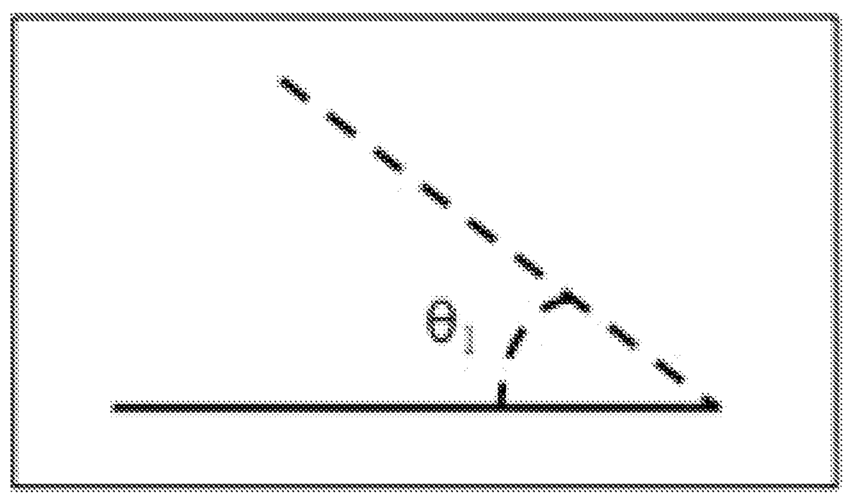
FIG. 23 shows a first rotation angle and second rotation angle on an attitude angle
Figure 23:
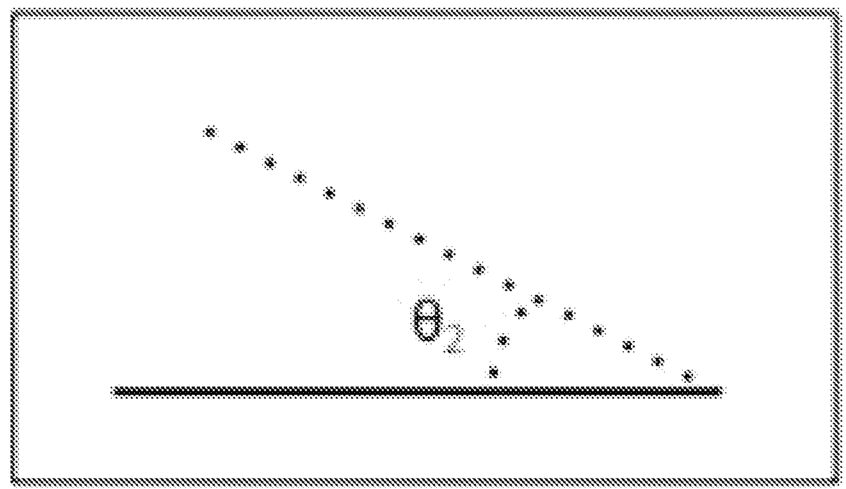
Figure 24:
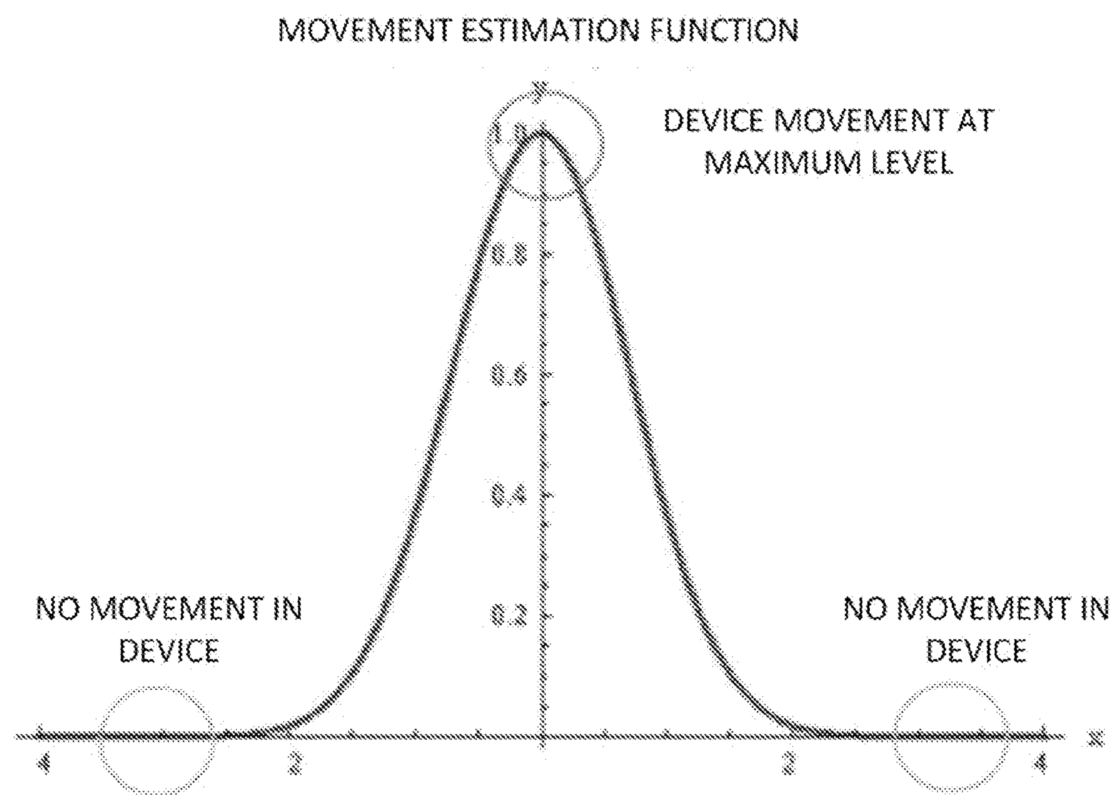
FIG. 24 shows a curve as a movement estimation function.
Figure 25:
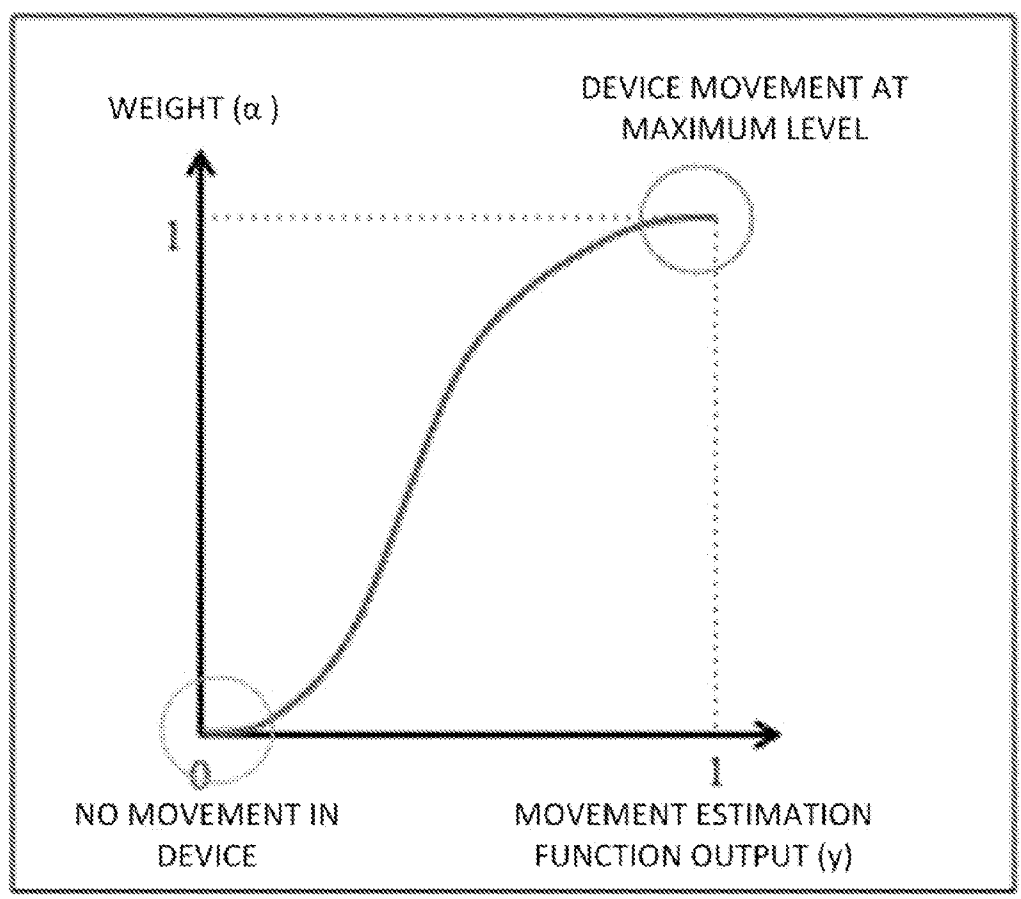
FIG. 25 shows a relationship between a weight and a movement estimation function output.
Figure 26:
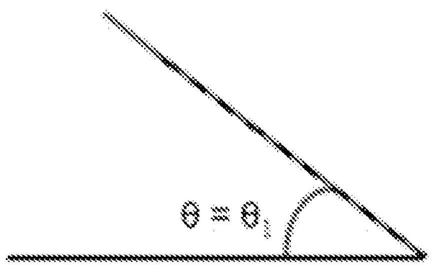
FIG. 26 shows setting a weight to a value between a maximum and minimum value if a device movement is between no movement and a maximum movement.
Figure 26:
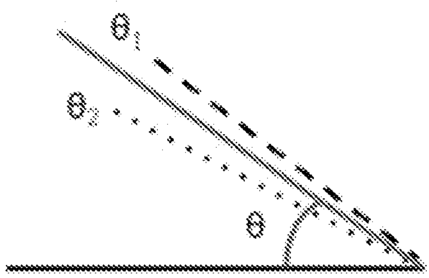

FIGS. 20, 21 and 22 show extended views of the three areas. First, FIG. 20 shows the relation between the input force intensity (F) and the output force intensity (F') in the depression area. The depression area is the state where the user keeps grabbing the input device 100, but as shown in FIG. 20, irregular waveforms in positive and negative directions are shown. However, such irregular waveforms are cut off not to exceed a certain range by the mapping function as in the first area (part 1) of FIG. 18.

FIG. 21 shows input force intensity (F) and output force intensity (F') in the scaling area. The scaling area is the case where the user gives appropriate force to the input device 100 within a certain range. Hence, the input force intensity (F) and output force intensity (F') show roughly proportional forms. FIG. 21 shows the case where the scaling element is set to 1, but the scaling element can be set to any other value depending on the applied application.

FIG. 22 shows the relation between the input force intensity (F) and the output force intensity (F') in the limitation area. The limitation area is the case where the user gives a strong force to the input device 100. The input force intensity (F) exceeding a certain numerical value is limited so that the outputted force intensity (F') does not exceed the maximum limit (±128 in the example of FIG. 20).

The force intensity can be converted into a normalized digital value such as an integer within the range of ±128 or ±256 by the mapping function explained above (Of course, it is possible to be converted into a floating-point digital value). If an analog value is converted into a digital value through a mapping function, noise reduction effects can be obtained. Also, generally values calculated using the accelerometer are floating-point type data.

For example, according to the definition of IEEE754, 4 bytes are used for a signal precision floating point number, and 8 bytes are used for a double precision floating point number. If such floating-point type data are digitalized and are then converted into integer-type data (commonly 1-2 bytes), the data volume can be reduced, thereby reducing the data volume to be transmitted in communication.

For example, if the floating point value is used as itself, floating-point type data according to each axis require 4 bytes, and if all values of the three axes are transmitted, a total of 12 bytes are necessary. However, if the force intensity is mapped by ±1024, 11 bits are necessary for each axis including signs, and a total of 33 bits are necessary for all three axes. It means about 4 bytes, which is about ⅓ of the volume when the analog values are used as themselves.

Further, the resolution of the digital value can be adjusted by adjusting the limitation range of the mapping function for the force intensity. For example, if the input force intensity (F) calculated using the accelerometer output is limited to the range of 0 g to 1 g and a mapping function that digitalizes the intensity to the range of ±1024, about 1 mg (101024≈1 mg) resolution is provided. If the input force intensity (F) is limited to 0 g to 2 g and a mapping function that digitalizes it to ±1024, about 2 mg resolution is provided. Likewise, the mapping function that provides digitalized information for the force intensity makes the necessary resolution adjustment according to the designer's intention, and makes reduced noise and easy data communication possible.

In the first embodiment, the object of calculation and mapping by the intensity calculation unit 170 and the intensity mapping unit 180 is the force intensity. However, according to the second embodiment, the intensity calculation unit 170 and the intensity mapping unit 170 can calculate and map the rotation intensity.

The rotation intensity refers to various rotation elements that can be expressed by the input device 100. As in the force intensity, if the attitude angle is estimated in a three-dimensional space, the rotation elements in a coordinate system independent of the attitude of the device, e.g., rotation intensity ($R_N$) in the navigation system can be calculated from the output of the angular rate sensor 110. The output of the angular rate sensor 110 or the filtering unit 130 is the rotation angular rate ($\omega_x$, $\omega_y$, $\omega_z$) in the body frame. The intensity calculation unit 170 can calculate rotation angle vector ($R_B$) in the body frame, i.e., rotation intensity ($R_B^x$, $R_B^y$, $R_B^z$) in the body frame by integrating such rotation angular rates for the time.

The example of the conversion equation that converts the rotation intensity vector ($R_B$) in the body frame into the rotation intensity vector ($R_N$) in the navigation frame is shown in the following equation 10. Here, the rotation intensity vector ($R_N$) consists of rotation intensity ($R_N^x$, $R_N y$, $R_N^z$), and the conversion matrix ($T_B^N$) consists of the attitude angle obtained from the attitude measuring unit 160, i.e., combination of $\phi$, $\theta$ and $\psi$.

$$R_N = T_B^N R_B \quad \text{Equation 10}$$

wherein, $$T_B^N = \begin{bmatrix} \cos(\theta) & \sin(\theta)\sin(\phi) & \sin(\theta)\cos(\phi) \\ 0 & \cos(\phi) & -\sin(\phi) \\ -\sin(\theta) & \cos(\theta)\sin(\phi) & \cos(\theta)\cos(\phi) \end{bmatrix}$$

In the second embodiment of the present invention, the intensity calculation unit 170 can calculate the rotation intensity in a navigation frame independent of the attitude of the device in such a manner.

The intensity mapping unit 180 maps the rotation intensity ($R_N$) obtained from the intensity calculation unit 170 to the actually outputted rotation intensity ($R_N'$) by the mapping function. Such a mapping process may be formed as in the first embodiment, so the explanation is skipped here.

Finally referring to FIG. 2, the transmission unit 195 wirelessly transmits the force intensity and/or rotation intensity outputted from the intensity mapping unit 180 to the display device depending on the type of the application. If the display device is integrally implemented with the input device 100, the data can be transmitted to the main processor. The wireless transmission can be done through Bluetooth communication, infrared communication, IEEE 802.11 wireless LAN standard, IEEE 802.15.3. wireless LAN standard, etc.

Each block of FIG. 2 can be implemented by a task, a class, a sub-routine, a process, an object, an execution thread, software such as a program, hardware such as FPGA (field-programmable gate array) and ASIC (application-specific integrated circuit) or a combination of the software and the hardware performed in a predetermined area of a memory. Also, each block may represent a portion of code, a segment or a module including one or more executable instructions to execute specified logical functions. Also, in some alternative examples, the above-mentioned functions can occur regardless of the order. For example, two consecutive blocks may be practically performed at the same time, or may even be performed in a reverse order depending to their functions.

An input device according to an exemplary embodiment of the present invention has practical advantages as follows.

1. Simplified System

The input device 100 according to the present invention may use the concept of the weighted average, the movement estimation function and the mapping function. Hence, the complicated operations for sampling data, which is necessary for a model-based filtering such as linear filtering, Kalman filtering, Kalman smoothing, extended Kalman filtering, state-space estimation and expectation-maximization, and the following initialization time are not required.

Further, the movement estimation function and the mapping function use a simplified form of 1:1 correspondence function unlike the matrix operation that occupies many resources. Hence, as such a simplified function is used, the operation time and resources are significantly reduced.

2. Attitude Angle in Navigation Frame

The input device 100 measures the rotation and acceleration of the body frame to calculate attitude information of the navigation frame. The position information (e.g., the movement of a pointer) is controlled through the obtained attitude information of the navigation frame, so the position information can be implemented regardless of the slant of the body frame. As stated above using the roll, pitch and yaw information (attitude angle information) in the navigation frame, various applications such as implementation of movements according to the user pattern, intuitive movement implementation and the control of the state of the display device are possible. Also, in the product design, there is no limitation on the rotation direction of the body frame, various designs regarding the outer appearance of the input device 100 are possible.

3. Movement Detection

In the existing technology, a simple stoppage is determined, but in the input device 100, the various movements such as the stoppage, minute movements, slow movements and fast movements can be detected, and the basis for more improved movements is provided through such various forms of movement detections. Also, the movement estimation function used in detecting movements makes the input correspond to the output by 1:1, thereby not occupying many resources.

4. Mapping

The mapping function consisting of the depression area, the scaling area and the limitation area provides more detailed and intuitive movements. Movements such as a trembling of a hand are removed through the depression area, and minute movements can be implemented through the scaling area, and the limitation of excessive movements is possible through the limitation area. In such a mapping function, it is possible to only take values of desired areas.

Also, the mapping function can convert a floating point value into a normalized digital value, and through the digitalization, advantages of digital signals such as reduction of noise and reduction of transmitted data amount are provided. Also, the mapping function used here does note require a separate initialization time and data sampling as in a model-based filtering, and is a simplified function where the input corresponds to the output by 1:1.

5. Stable and Accurate Movement Implementation Using Weighted Averages

In the input device 100, the weighted average is calculated based on each set of information implemented by the output of the angular rate sensor and the output of the accelerometer, so more stable and accurate movements can be implemented. If only the angular rate sensor is used, accumulated errors by the bias change are generated in the process of implementing angles by integrating angular rates, thereby generating divergence of angular rates, and there technologies to resolve such a problem are known. Some examples of such technologies are a method of estimating a bias through Kalman filter, a method of using a digital filter through frequency analysis and a method of estimating a bias by analyzing given time and critical values. However, all such existing technologies excessively consume system resources and require a large amount of operation.

In contrast, in the case of the input device 100, the concept of the weighted average is applied using the angular rate and the accelerometer, so the divergence of the angle can be simply limited by the accelerometer, by which the model or the filter used in estimating the bias of the angular rate can be simplified constituted, and the accuracy of the attitude angle measurement can be improved. Through the calculated attitude angle, more stable and accurate movements can be implemented.

Also, in the input device 100, if the movement is detected by the movement estimation function, the user-intended various movements can be expressed by changing each weight ($\alpha_1$, $\alpha_2$, $\alpha_3$ of equation 7) according to the detected movement. That is, appropriate movements harmonized with the situation can be implemented.

6. Reducing System Initialization Time

According to a simplified system of the input device 100, the initialization time of the device can be reduced. A representative example is the concept of a weighted average. If an angle is implemented only by an angular rate, a separate filtering technique such as Kalman filtering is required to minimize accumulated errors. In the case of the Kalman filtering, the initialization step for the initial bias estimation or bias setting is essentially required.

In contrast, the user instruction command device 100 can calculate the accurate angle without such an initialization step by implementing each set of information using the weighted average with the output of the accelerometer along with the accelerometer. That is, the accuracy of the attitude angle measurement can be improved with the system is simplified.

Also, unlike the model-based filtering, the mapping function centers on 1:1 correspondence, so it contributes to initialization time reduction to some extent.

7. Reducing Power Consumption

According to a simplified system of the input device 100, the consumption power can be reduced based on the reduction of the initialization time and operation amount. As the initialization time of the system is reduced, there can be simplified operation modes such as operation mode, power-down mode and power-off mode.

The existing technologies needed temporary steps such as a stand-by mode that stabilizes the system for entering the operation mode. However, the input device 100 does not need a temporary step such as a stand-by mode, so the power supplied to a certain element can be selectively turned off. Hence, if the on-off of the device power gets easy, the consumption power can be more reduced.

8. Provision of Force Intensity

The input device 100 provides force intensity as information related with acceleration along with the attitude angle. If the output value of the accelerometer is used as itself using information related with acceleration, accurate information implementation according to movement is difficult due to the fact that the gravity elements are included. Also, if a simple scaling for the output of the accelerometer is used, noise is increased.

In an input device 100 of the present invention, the intensity calculation unit 170 may calculate the attitude angle provided from the attitude angle measuring unit 160 and the force intensity of the navigation frame or yaw drift frame based on the output value of the acceleration sensor 120. Also, the intensity mapping unit 180 converts the force intensity calculated in the intensity calculation unit 170 into the mapped information. By such a mapping, the user of the input device 100 can feel intuitive and natural force senses.

Also, the input device 100 can calculate the force intensity that has not removed gravity elements or the force intensity that has removed gravity elements using attitude angle information obtained from the attitude angle measuring unit 160.

9. Provision of Rotation Intensity

The input device 100 can provide not only the attitude and force intensity information, but also rotation intensity information. If the force intensity means information for linear movement, rotation intensity means information for rotation movements.

In the input device 100 of the present invention, the intensity calculation unit 170 can calculate rotation intensity in the navigation based on the attitude angle provided from the attitude measuring unit 160 and the output value of the angular rate sensor 110. Also, the intensity mapping unit 180 converts rotation intensity calculated from the intensity calculation unit 170 into the mapped information. By such a mapping, the user of the input device 100 can feel intuitive and natural rotation senses.

Actual movements of a person include linear movements and rotation movements, so if the force intensity and rotation intensity are integrally applied, more improved and various expressions of movements become possible. Hence, the input device 100 can be variously applied to several applications such as a game input device.

It should be understood by those of ordinary skill in the art that various replacements, modifications and changes may be made in the form and details without departing from the spirit and scope of the present invention as defined by the following claims. Therefore, it is to be appreciated that the above described embodiments are for purposes of illustration only and are not to be construed as limitations of the invention.

What is claimed is:

1. An input device for operating in a three-dimensional space and inputting user instructions, the device comprising:

a first operation unit that calculates a first rotation angle in a coordinate system independent of the attitude of the device based on the output value of a first angular rate sensor, wherein the first rotation angle is a first representation of an attitude angle of the input device;

a second operation unit that calculates a second rotation angle in the coordinate system based on the output value of a first linear acceleration sensor, wherein the second rotation angle is a second representation of the attitude angle of the input device;

an attitude angle measuring unit that calculates the attitude angle of the input device by combining the first rotation angle and the second rotation angle; and an intensity calculation unit that calculates force intensity in the coordinate system using acceleration of the input device and the attitude angle of the input device obtained in the attitude measuring unit, wherein the calculated first rotation angle and the second rotation angle are combined by a weighted average, and wherein a weight used in the weighted average is estimated by a predetermined movement estimation function, the movement estimation function setting the weight to reflect only a second rotation angle on the attitude angle if there is no movement in the device, the movement estimation function setting the weight to reflect only a first rotation angle on the attitude angle if the device movement is at the maximum level, and the movement estimation function setting the weight to a value between the value at no movement and the value at the maximum movement if the device movement is between no movement and the maximum movement.

2. The input device of claim 1, further comprising an intensity mapping unit that maps the calculated force intensity to finally outputted force intensity according to a mapping function.

3. The input device of claim 2, wherein the mapping function includes at least two of three areas, which are a depression area that reduces or removes and outputs an input value of the function, a scaling area that maps an input value of the function to a roughly proportional output value, and a limitation area that limits the output value for an input value exceeding a certain value.

4. The input device of claim 1, wherein the intensity calculation unit calculates force intensity of a body frame based on the acceleration, and converts the calculated force intensity into force intensity in the coordinate system.

5. The input device of claim 4, wherein the coordinate system is a navigation frame or a yaw drift frame.

6. The input device of claim 1, wherein the first rotation angle is calculated by a differential equation that uses an output value of the first sensor and the first rotation angle as variables.

7. The input device of claim 1, wherein the yaw of the second rotation angle is calculated by combination of the roll and the pitch of the second rotation angle.

8. An input device for operating in a three-dimensional space and inputting user instructions, the device comprising:

a first operation unit that calculates a first rotation angle in a coordinate system independent of the attitude of the device based on the output value of a first angular rate sensor, wherein the first rotation angle is a first representation of an attitude angle of the input device;

a second operation unit that calculates a second rotation angle in the coordinate system based on the output of a first linear acceleration sensor, wherein the second rotation angle is a second representation of the attitude angle of the input device;

an attitude measuring unit that calculates the attitude angle of the input device by combining the first rotation angle and the second rotation angle; and an intensity calculation unit that calculates rotation intensity in the coordinate system based on the angular rate of the input device and the attitude angle of the input device obtained from the attitude angle measuring unit, wherein the calculated first rotation angle and the second rotation angle are combined by a weighted average, and wherein a weight used in the weighted average is estimated by a predetermined movement estimation function, the movement estimation function setting the weight to reflect only a second rotation angle on the attitude angle if there is no movement in the device, the movement estimation function setting the weight to reflect only a first rotation angle on the attitude angle if the device movement is at the maximum level, and the movement estimation function setting the weight to a value between the value at no movement and the value at the maximum movement if the device movement is between no movement and the maximum movement.

9. The input device of claim 8, further comprising an intensity mapping unit that maps the calculated rotation intensity to finally outputted rotation intensity by a mapping function.

10. The input device of claim 9, wherein the mapping function includes at least two of three areas, which are a depression area that reduces or removes and outputs an input value of the function, a scaling area that maps an input value of the function to a roughly proportional output value, and a limitation area that limits the output value for an input value exceeding a certain value.

11. The input device of claim 8, wherein the intensity calculation unit calculates rotation intensity of a body frame based on the acceleration, and converts the calculated rotation angle into rotation intensity in the coordinate system.

12. The input device of claim 11, wherein the coordinate system is a navigation frame or a yaw drift frame.

13. A method of inputting user instructions using an input device operating in a three-dimensional space, the method comprising:

calculating a first rotation angle in a coordinate system independent of the attitude of the device based on the output value of a first angular rate sensor, wherein the first rotation angle is a first representation of an attitude angle of the input device;

calculating a second rotation angle in the coordinate system based on the output value of a first linear acceleration sensor, wherein the second rotation angle is a second representation of the attitude angle of the input device;

calculating the attitude angle of the input device by combining the first rotation angle and the second rotation angle; and calculating force intensity in the coordinate system using the acceleration of the input device and the attitude angle of the input device obtained from an attitude angle measuring unit, wherein the calculated first rotation angle and the second rotation angle are combined by a weighted average, and wherein a weight used in the weighted average is estimated by a predetermined movement estimation function, the movement estimation function setting the weight to reflect only a second rotation angle on the attitude angle if there is no movement in the device, the movement estimation function setting the weight to reflect only a first rotation angle on the attitude angle if the device movement is at the maximum level, and the movement estimation function setting the weight to a value between the value at no movement and the value at the maximum movement if the device movement is between no movement and the maximum movement.

14. A method of inputting user instructions using an input device operating in a three-dimensional space, the method comprising:

calculating a first rotation angle in a coordinate system independent of the attitude of the device based on the output value of a first angular rate sensor, wherein the first rotation angle is a first representation of an attitude angle of the input device;

calculating a second rotation angle in the coordinate system based on the output value of a first linear acceleration sensor, wherein the second rotation angle is a second representation of the attitude angle of the input device;

calculating the attitude angle of the input device by combining the first rotation angle and the second rotation angle; and calculating rotation intensity in the coordinate system using the angular rate of the device and the attitude angle of the input device, wherein the calculated first rotation angle and the second rotation angle are combined by a weighted average, and wherein a weight used in the weighted average is estimated by a predetermined movement estimation function, the movement estimation function setting the weight to reflect only a second rotation angle on the attitude angle if there is no movement in the device, the movement estimation function setting the weight to reflect only a first rotation angle on the attitude angle if the device movement is at the maximum level, and the movement estimation function setting the weight to a value between the value at no movement and the value at the maximum movement if the device movement is between no movement and the maximum movement.

* * * * *